United States Patent [19]

Gasper et al.

[11] Patent Number: 5,630,017
[45] Date of Patent: *May 13, 1997

[54] ADVANCED TOOLS FOR SPEECH SYNCHRONIZED ANIMATION

[75] Inventors: Elon Gasper, Bellevue; Joseph H. Matthews, III, Bothell; Richard Wesley, Seattle, all of Wash.

[73] Assignee: Bright Star Technology, Inc., Bellevue, Wash.

[*] Notice: The term of this patent shall not extend beyond the expiration date of Pat. No. 4,884,972.

[21] Appl. No.: 458,007

[22] Filed: May 31, 1995

Related U.S. Application Data

[62] Division of Ser. No. 65,704, May 20, 1993, abandoned, which is a continuation of Ser. No. 657,714, Feb. 19, 1991, abandoned.

[51] Int. Cl.$^6$ .................................................. G10L 3/00
[52] U.S. Cl. .................. 395/2.85; 395/173; 395/956; 395/957
[58] Field of Search ................................... 395/152, 154, 395/2.69, 2.85, 2, 2.1; 364/410; 434/307 R

[56] References Cited

U.S. PATENT DOCUMENTS

| | | | |
|---|---|---|---|
| 4,260,229 | 4/1981 | Bloomstein | 395/2.85 |
| 4,841,575 | 6/1989 | Welsh et al. | 381/48 |
| 4,884,972 | 12/1989 | Gasper | 434/189 |
| 5,025,394 | 6/1991 | Parke | 395/152 |
| 5,101,364 | 3/1992 | Davenport et al. | 395/152 |
| 5,111,409 | 5/1992 | Gasper et al. | 395/152 |
| 5,174,759 | 12/1992 | Preston et al. | 364/410 |
| 5,214,758 | 5/1993 | Ohba et al. | 395/152 |
| 5,278,943 | 1/1994 | Gasper et al. | 395/2 |

FOREIGN PATENT DOCUMENTS 9005350  5/1990  WIPO ..................................... 395/154

OTHER PUBLICATIONS

Korein et al. "Temporal Anti-Aliasing in Computer Generated Animation", Computer Graphics, vol. 17, No. 3, Jul. 1983, pp. 377–388.

*Primary Examiner*—Kee M. Tung
*Attorney, Agent, or Firm*—LaRiviere, Grubman & Payne

[57] ABSTRACT

A random access animation user interface environment referred to as interFACE enabling a user to create and control animated lip-synchronized images or objects utilizing a personal computer for use in the users programs and products. A real-time random-access interface driver (RAVE) together with a descriptive authoring language (RAVEL) is used to provide synthesized actors ("synactors"). The synactors may represent real or imaginary persons or animated characters, objects or scenes. The synactors may be created and programmed to perform actions including speech which are not sequentially prestored records of previously enacted events. Furthermore, animation and sound synchronization may be produced automatically and in real-time. Sounds and visual images of a real or imaginary person or animated character associated with those sounds are input to a system and may be decomposed into constituent parts to produce fragmentary images and sounds. A set of characteristics is utilized to define a digital model of the motions and sounds of a particular synactor. The general purpose system is provided for random access and display of synactor images on a frame-by-frame basis, which is organized and synchronized with sound. Both synthetic speech and digitized recording may provide the speech for synactors.

16 Claims, 44 Drawing Sheets

FILE

| Preferences... | ⌘P |
|---|---|
| Help... | |
| Context Sensitive Help... | ⌘? |
| Import from Scrapbook... | |
| Export to Scrapbook... | |
| Print Images... | |
| Quit interFACE | ⌘Q |

FIG. 9a

EDIT

| Cut | ⌘K |
|---|---|
| Copy | ⌘C |
| Paste | ⌘U |
| Clear Easel | |
| Paste to Easel | |
| Revert Image | |
| Add New Image | ⌘= |
| Delete Last Image | ⌘− |
| Copy Rest to All | |
| Actor Info... | ⌘A |
| Convert Actor... | |
| Resize Actor... | |
| Crop to Guides | |

| Dressing Room | ⌘1 |
|---|---|
| Stage | ⌘2 |
| Speech Sync | ⌘3 |
| Navigation Panel | |

FIG. 9c

ACTORS

| Open Actor... | ⌘O |
|---|---|
| Close Actor | ⌘W |
| Save Actor | ⌘S |
| Save Actor As... | |
| Prev Image | ⌘[ |
| Next Image | ⌘] |
| Go to Image... | ⌘l |
| Copy Actor... | |
| Delete Actor... | |

FIG. 9d

SOUNDS

| Open Sound... | |
|---|---|
| Close Sound | |
| Play Sound | |
| Record Sound | |
| Copy Sound... | |
| Delete Sound... | |

FIG. 9e

Export Images: —907
From: [1]  To: [1] —909
☒ Export With Frame ☐
[Cancel]  [Continue]

FIG. 9g

Print Images: —911
From: [1]  To: [1] —913
Images per Page: [9]
☒ Print With Easel ☐
[Cancel]  [Continue]

FIG. 9h

| | | | |
|---|---|---|---|
|  Rest 1 | | | The Rest image is displayed when the actor is not saying anything. It is not considered a true speaking image. However, the Rest image can be extremely useful to display during pauses in speaking. |
|  F 2 | | far fought fun | The F sound is created by placing the upper teeth on the tucked-in lower lip. Because of their similarities, the F lip position also represents V. |
|  M 3 | | mother money mud | The M image should show the lips pressed together. The M image also represents the B and P positions. |
|  R 4 | | rough run rut | The R image is a generalized position. The mouth is slightly open and pursed. |
|  L< 23 | | lay leach leaf | This is the retracted version of the L image. |
| 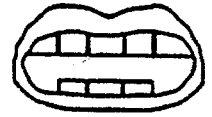 K< 24 | | geek key king | This is the retracted version of the K image. The K image can also represent the G sound. |
| 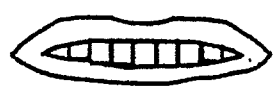 F> 25 | | foal food fool foot | This is the protruded version of the F image. |
|  M> 26 | | boom moat moo move | This is the protruded version of the M image. |

Standard Synactor Ravel

Copyright 1990 Bright Star Technology, Inc.

All Rights Reserved

```
/*   8 Faces for speaking   */
/* 112 Faces for EXPRESSIONS */

DEFINE READER 6 \  /* use \ as string terminator */

/* phonetics rule     orthophonetic rules     */
[A]$=AH\;
$[ARE]$=AAR\;
[Y]=IH\;
Z[Z]=\;
[Z]=Z\;
[~]=~\;
[]=~\;
\\  /* end of rules for reader 6 */

VOICE 6
"1" " #"
"2" " #"
"3" " #"
"4" " #"
"5" " #"
"6" " #"
"7" " #"
"8" " #"
"9" " #"
" " " #"
"|" " #" 3 1
"#" " #"
"(" " #"
")" " #"
"," " #" 3 1
"-" " #"
"." " #" 5 1
";" " #" 4 1
"?" " #" 3 1
"_" " #"
"/C" "/CAX #" 1  4
"/H" "/HAX #" 1  4
"A0" "SS #" 1  1   /* AT REST */
"A1" "SS #" 1  9
"A2" "SS #" 1 10
"A3" "SS #" 1 11
"A4" "SS #" 1 12
"A5" "SS #" 1 13
"A6" "SS #" 1 14
"A7" "SS #" 1 15
"A8" "SS #" 1 16
"A9" "SS #" 1 17
```

Figure 14.2

```
"AA" "AA #" 1   7
"AE" "AE #" 1   8
"AH" "AH #" 1   6
"AO" "AO #" 1   7
"AW" "AW #" 5   7   1   5
"AX" "AX #" 1   6
"AY" "AY #" 5   7   1   6
"B"  "BAX #" 1  3
"B1" "SS #" 1   18
"B2" "SS #" 1   19
"B3" "SS #" 1   20
"B4" "SS #" 1   21
"B5" "SS #" 1   22
"B6" "SS #" 1   23
"B7" "SS #" 1   24
"B8" "SS #" 1   25
"B9" "SS #" 1   26
"C1" "SS #" 1   27
"C2" "SS #" 1   28
"C3" "SS #" 1   29
"C4" "SS #" 1   30
"C5" "SS #" 1   31
"C6" "SS #" 1   32
"C7" "SS #" 1   33
"C8" "SS #" 1   34
"C9" "SS #" 1   35
"CH" "CHAX #" 1  4
"D"  "DAX #"  1  4
"D1" "SS #" 1   36
"D2" "SS #" 1   37
"D3" "SS #" 1   38
"D4" "SS #" 1   39
"D5" "SS #" 1   40
"D6" "SS #" 1   41
"D7" "SS #" 1   42
"D8" "SS #" 1   43
"D9" "SS #" 1   44
"DH" "DHAX #" 1  4
"DX" "DX #" 1   4
"E"  "SS #" 1   8
"E1" "SS #" 1   45
"E2" "SS #" 1   46
"E3" "SS #" 1   47
"E4" "SS #" 1   48
"E5" "SS #" 1   49
"E6" "SS #" 1   50
"E7" "SS #" 1   51
"E8" "SS #" 1   52
"E9" "SS #" 1   53
"EH" "EH #" 1   6
"ER" "ER #" 1   5
"EY" "EY #" 1   8
"F"  "FAX #" 1  2
```

Figure 14.3

```
"F1" "SS #" 1  54
"F2" "SS #" 1  55
"F3" "SS #" 1  56
"F4" "SS #" 1  57
"F5" "SS #" 1  58
"F6" "SS #" 1  59
"F7" "SS #" 1  60
"F8" "SS #" 1  61
"F9" "SS #" 1  62
"G"  "GAX #" 1  4
"G1" "SS #" 1  63
"G2" "SS #" 1  64
"G3" "SS #" 1  65
"G4" "SS #" 1  66
"G5" "SS #" 1  67
"G6" "SS #" 1  68
"G7" "SS #" 1  69
"G8" "SS #" 1  70
"G9" "SS #" 1  71
"H1" "SS #" 1  72
"H2" "SS #" 1  73
"H3" "SS #" 1  74
"H4" "SS #" 1  75
"H5" "SS #" 1  76
"H6" "SS #" 1  77
"H7" "SS #" 1  78
"H8" "SS #" 1  79
"H9" "SS #" 1  80
"IH" "IH #" 1  6
"IL" "IL #" 5  6   1  4
"IM" "IM #" 5  6   1  3
"IN" "IN #" 5  6   1  4
"IX" "IX #" 1  6
"IY" "IY #" 1  8
"J"  "JAX #" 1  4
"J1" "SS #" 1  81
"J2" "SS #" 1  82
"J3" "SS #" 1  83
"J4" "SS #" 1  84
"J5" "SS #" 1  85
"J6" "SS #" 1  86
"J7" "SS #" 1  87
"J8" "SS #" 1  88
"J9" "SS #" 1  89
"K"  "KAX #" 1  4
"K1" "SS #" 1  90
"K2" "SS #" 1  91
"K3" "SS #" 1  92
"K4" "SS #" 1  93
"K5" "SS #" 1  94
"K6" "SS #" 1  95
"K7" "SS #" 1  96
"K8" "SS #" 1  97
```

Figure 14.4

```
"K9" "SS #" 1  98
"L"  "LXLX #" 1  4
"L1" "SS #" 1  99
"L2" "SS #" 1 100
"L3" "SS #" 1 101
"L4" "SS #" 1 102
"L5" "SS #" 1 103
"L6" "SS #" 1 104
"L7" "SS #" 1 105
"L8" "SS #" 1 106
"L9" "SS #" 1 107
"LX" "LXLX #" 1  4
"M"  "MMM #" 1  3
"M1" "SS #" 1 108
"M2" "SS #" 1 109
"M3" "SS #" 1 110
"M4" "SS #" 1 111
"M5" "SS #" 1 112
"M6" "SS #" 1 113
"M7" "SS #" 1 114
"M8" "SS #" 1 115
"M9" "SS #" 1 116
"N"  "NN #" 1  4
"N1" "SS #" 1 117
"N2" "SS #" 1 118
"N3" "SS #" 1 119
"N4" "SS #" 1 120
"NX" "NNQXGAX #" 1  4
"OH" "OH #" 1  7
"OW" "OW #" 4  7  1  5
"OY" "OY #" 5  6  1  8
"P"  "PAX #" 1  3
"Q"  "Q #"   1  4
"QX" "QX #" 1  4         /* kluge */
"R"  "RR #" 1  4
"RX" "R #"  1  4
"S"  "SS #" 1  4
"SH" "SH #" 1  4
"T"  "TAX #" 1  4
"TH" "THAX #" 1  4
"UH" "UH #" 1  6
"UL" "UL #" 5  6  1  4
"UM" "UM #" 5  6  1  3
"UN" "UN #" 5  6  1  4
"UW" "UW #" 1  5
"UX" "UX #" 1  5  /* ditto */
"V"  "VAX #" 1  2
"W"  "WUH #" 1  5
"WH" "WUH #" 1  5
"Y"  "YAX #" 1  4
"Z"  "ZZZ #" 1  4
"ZH" "ZHAX #" 1  4
```

Figure 14.5

```
LIPPARAMS     160    128    16    16    ;
ACTOR 1
ENDVOICE "FACE1.img"
```

FIGURE 15

Extended Actor RAVEL

Copyright 1990 Bright Star Technology, Inc.

All Rights Reserved

```
/* 15 Faces for speaking    */
/* 113 Faces for EXPRESSIONS */

DEFINE READER 6 \  /* use \ as string terminator */

/* phonetics rule     orthophonetic rules    */
[A] $=AH\;
$[ARE] $=AAR\;
[Y]=IH\;
Z[Z]=\;
[Z]=Z\;
[-]=-\;
[]=-\;
\\  /* end of rules for reader 6 */

VOICE 6
"1"  "  #"
"2"  "  #"
"3"  "  #"
"4"  "  #"
"5"  "  #"
"6"  "  #"
"7"  "  #"
"8"  "  #"
"9"  "  #"
"   "  "  #"
"!"  "  #"  3 1
"#"  "  #"
"("  "  #"
")"  "  #"
","  "  #"  3 1
"-"  "  #"
"."  "  #"  5 1
";"  "  #"  4 1
"?"  "  #"  3 1
"_"  "  #"
"/C" "/CAX #" 1  7
"/H" "/HAX #" 1  7
"A0" "SS #" 1  1   /* AT REST */
"A1" "SS #" 1  16
"A2" "SS #" 1  17
"A3" "SS #" 1  18
"A4" "SS #" 1  19
"A5" "SS #" 1  20
"A6" "SS #" 1  21
"A7" "SS #" 1  22
"A8" "SS #" 1  23
"A9" "SS #" 1  24
```

Figure 15.2

```
"AA"  "AA #"   1    7
"AE"  "AE #"   1    8
"AH"  "AH #"   1    6
"AO"  "AO #"   1    7
"AW"  "AW #"   5    7    1    9
"AX"  "AX #"   1    6
"AY"  "AY #"   5    7    1    6
"B"   "BAX #"  1    3
"B1"  "SS #"   1   25
"B2"  "SS #"   1   26
"B3"  "SS #"   1   27
"B4"  "SS #"   1   28
"B5"  "SS #"   1   29
"B6"  "SS #"   1   30
"B7"  "SS #"   1   31
"B8"  "SS #"   1   32
"B9"  "SS #"   1   33
"C1"  "SS #"   1   34
"C2"  "SS #"   1   35
"C3"  "SS #"   1   36
"C4"  "SS #"   1   37
"C5"  "SS #"   1   38
"C6"  "SS #"   1   39
"C7"  "SS #"   1   40
"C8"  "SS #"   1   41
"C9"  "SS #"   1   42
"CH"  "CHAX #" 1   13
"D"   "DAX #"  1   11
"D1"  "SS #"   1   43
"D2"  "SS #"   1   44
"D3"  "SS #"   1   45
"D4"  "SS #"   1   46
"D5"  "SS #"   1   47
"D6"  "SS #"   1   48
"D7"  "SS #"   1   49
"D8"  "SS #"   1   50
"D9"  "SS #"   1   51
"DH"  "DHAX #" 1   12
"DX"  "DX #"   1   11
"E"   "SS #"   1    8
"E1"  "SS #"   1   52
"E2"  "SS #"   1   53
"E3"  "SS #"   1   54
"E4"  "SS #"   1   55
"E5"  "SS #"   1   56
"E6"  "SS #"   1   57
"E7"  "SS #"   1   58
"E8"  "SS #"   1   59
"E9"  "SS #"   1   60
"EH"  "EH #"   1    6
"ER"  "ER #"   1    9
"EY"  "EY #"   1    8
```

Figure 15.3

```
"F"  "FAX #"  1   2
"F1" "SS #"   1  61
"F2" "SS #"   1  62
"F3" "SS #"   1  63
"F4" "SS #"   1  64
"F5" "SS #"   1  65
"F6" "SS #"   1  66
"F7" "SS #"   1  67
"F8" "SS #"   1  68
"F9" "SS #"   1  69
"G"  "GAX #"  1  15
"G1" "SS #"   1  70
"G2" "SS #"   1  71
"G3" "SS #"   1  72
"G4" "SS #"   1  73
"G5" "SS #"   1  74
"G6" "SS #"   1  75
"G7" "SS #"   1  76
"G8" "SS #"   1  77
"G9" "SS #"   1  78
"H1" "SS #"   1  79
"H2" "SS #"   1  80
"H3" "SS #"   1  81
"H4" "SS #"   1  82
"H5" "SS #"   1  83
"H6" "SS #"   1  84
"H7" "SS #"   1  85
"H8" "SS #"   1  86
"H9" "SS #"   1  87
"IH" "IH #"   1   6
"IL" "IL #"   5   6   1  14
"IM" "IM #"   5   6   1   3
"IN" "IN #"   5   6   1  11
"IX" "IX #"   1   6
"IY" "IY #"   1   8
"J"  "JAX #"  1  13
"J1" "SS #"   1  88
"J2" "SS #"   1  89
"J3" "SS #"   1  90
"J4" "SS #"   1  91
"J5" "SS #"   1  92
"J6" "SS #"   1  93
"J7" "SS #"   1  94
"J8" "SS #"   1  95
"J9" "SS #"   1  96
"K"  "KAX #"  1  15
"K1" "SS #"   1  97
"K2" "SS #"   1  98
"K3" "SS #"   1  99
"K4" "SS #"   1 100
"K5" "SS #"   1 101
"K6" "SS #"   1 102
```

Figure 15.4

```
"K7" "SS #" 1 103
"K8" "SS #" 1 104
"K9" "SS #" 1 105
"L"  "LXLX #" 1  14
"L1" "SS #" 1 106
"L2" "SS #" 1 107
"L3" "SS #" 1 108
"L4" "SS #" 1 109
"L5" "SS #" 1 110
"L6" "SS #" 1 111
"L7" "SS #" 1 112
"L8" "SS #" 1 113
"L9" "SS #" 1 114
"LX" "LXLX #" 1  14
"M"  "MMM #" 1   3
"M1" "SS #" 1 115
"M2" "SS #" 1 116
"M3" "SS #" 1 117
"M4" "SS #" 1 118
"M5" "SS #" 1 119
"M6" "SS #" 1 120
"N"  "NN #" 1  11
"NX" "NNQXGAX #" 1  15
"OH" "OH #" 1   9
"OW" "OW #" 4   9 1 5
"OY" "OY #" 5   9 1 6
"P"  "PAX #" 1   3
"Q"  "Q #"    1  15
"QX" "QX.#" 1  15         /* kluge */
"R"  "RR #" 1   4
"RX" "R #" 1   4
"S"  "SS #" 1  10
"SH" "SH #" 1  13
"T"  "TAX #" 1  11
"TH" "THAX #" 1  12
"UH" "UH #" 1   9
"UL" "UL #" 1   6  1 14
"UM" "UM #" 1   6  1  3
"UN" "UN #" 1   6  1 11
"UW" "UW #" 1   5
"UX" "UX #" 1   5 /* ditto */
"V"  "VAX #" 1   2
"W"  "WUH #" 1   5
"WH" "WUH #" 1   5
"Y"  "YAX #" 1  15
"Z"  "ZZZ #" 1  10
"ZH" "ZHAX #" 1  13
;
LIPPARAMS    160   128    16   16   ;
ACTOR 2
ENDVOICE "FACE1.img"
;
```

Figure 16

Coart Actor RAVEL

Copyright 1990 Bright Star Technology, Inc.

All Rights Reserved

```
/* 32 Faces for speaking    */
/* 88 Faces for EXPRESSIONS */

DEFINE READER 6 \  /* use \ as string terminator */

/* phonetics rule      orthophonetic rules   */
[A]$=AH\;
$[ARE]$=AAR\;
[Y]=IH\;
Z[Z]=\;
[Z]=Z\;
[~]=~\;
[]=~\;
\\  /* end of rules for reader 6 */
/**********************************************************/
COARTICUL  /* Tell compiler that this is a coarticulated actor */
VOICE 6    /* synthetic actor number                           */
SILENCE    /* These phonemes have no action, no sound          */
"1" " #"
"2" " #"
"3" " #"
"4" " #"
"5" " #"
"6" " #"
"7" " #"
"8" " #"
"9" " #"
"  " " #"
"!" " #" 3 1 1
"#" " #"
"(" " #"
")" " #"
"," " #" 3 1 1
"-" " #"
"." " #" 5 1 1
";" " #" 4 1 1
"?" " #" 3 1 1
"_" " #"
VOWELS 3
CONSONANT
"/C" "/CAX #"    1  9  3
"/C" "/CAX #"    1  6  2
"/C" "/CAX #"    1  7  1
"/H" "/HAX #"    1  9  3
"/H" "/HAX #"    1  6  2
"/H" "/HAX #"    1  7  1
SILENCE
"AO" "SS #"      1  1  1   /* AT REST */
```

Figure 16.2

```
"A1"  "SS #"    1  33  1
"A2"  "SS #"    1  34  1
"A3"  "SS #"    1  35  1
"A4"  "SS #"    1  36  1
"A5"  "SS #"    1  37  1
"A6"  "SS #"    1  38  1
"A7"  "SS #"    1  39  1
"A8"  "SS #"    1  40  1
"A9"  "SS #"    1  41  1
VOWELS 3
"AA"  "AA #"    1   7  1  /* 'o' in brought  */
"AE"  "AE #"    1   8  2  /* 'a' in bat      */
"AH"  "AH #"    1   6  1  /* 'u' in butt     */
"AO"  "AO #"    1   7  1  /* 'a' in balk     */
"AW"  "AW #"    6   7  1  /* 'a' in out      */
                1   9  3  /* 'u' in out      */
"AX"  "AX #"    1   6  1  /* 'a' in about    */
"AY"  "AY #"    6   7  1  /* 'a' in formulae */
                1   6  2  /* 'e' in formulae */
CONSONANT
"B"   "BAX #"   1  26  3
"B"   "BAX #"   1  17  2
"B"   "BAX #"   1   3  1
SILENCE
"B1"  "SS #"    1  42  1
"B2"  "SS #"    1  43  1
"B3"  "SS #"    1  44  1
"B4"  "SS #"    1  45  1
"B5"  "SS #"    1  46  1
"B6"  "SS #"    1  47  1
"B7"  "SS #"    1  48  1
"B8"  "SS #"    1  49  1
"B9"  "SS #"    1  50  1
"B>"  "SS #"    1  26  3
"B<"  "SS #"    1  17  2
"C1"  "SS #"    1  51  1
"C2"  "SS #"    1  52  1
"C3"  "SS #"    1  53  1
"C4"  "SS #"    1  54  1
"C5"  "SS #"    1  55  1
"C6"  "SS #"    1  56  1
"C7"  "SS #"    1  57  1
"C8"  "SS #"    1  58  1
"C9"  "SS #"    1  59  1
CONSONANT
"CH"  "CHAX #"  1  30  3
"CH"  "CHAX #"  1  22  2
"CH"  "CHAX #"  1  13  1
"D"   "DAX #"   1  28  3
"D"   "DAX #"   1  20  2
"D"   "DAX #"   1  11  1
SILENCE
```

Figure 16.3

```
"D1" "SS #"      1   60   1
"D2" "SS #"      1   61   1
"D3" "SS #"      1   62   1
"D4" "SS #"      1   63   1
"D5" "SS #"      1   64   1
"D6" "SS #"      1   65   1
"D7" "SS #"      1   66   1
"D8" "SS #"      1   67   1
"D9" "SS #"      1   68   1
"D>" "SS #"      1   28   3
"D<" "SS #"      1   20   2
CONSONANT
"DH" "DHAX #"    1   29   3
"DH" "DHAX #"    1   21   2
"DH" "DHAX #"    1   12   1
CONSONANT
"DX" "DX #"      1   28   3
"DX" "DX #"      1   20   2
"DX" "DX #"      1   11   1
SILENCE
"E"  "SS #"      1    8   1   /* 'ee' in beet    */
SILENCE
"E1" "SS #"      1   69   1
"E2" "SS #"      1   70   1
"E3" "SS #"      1   71   1
"E4" "SS #"      1   72   1
"E5" "SS #"      1   73   1
"E6" "SS #"      1   74   1
"E7" "SS #"      1   75   1
"E8" "SS #"      1   76   1
"E9" "SS #"      1   77   1
VOWELS 3
"EH" "EH #"      1    6   2   /* 'e'  in bet     */
"ER" "ER #"      1    9   3   /* 'ir' in bird    */
"EY" "EY #"      6    8   2   /* 'e'  in beige   */
CONSONANT
"F"  "FAX #"     1   25   3
"F"  "FAX #"     1   16   2
"F"  "FAX #"     1    2   1
SILENCE
"F1" "SS #"      1   78   1
"F2" "SS #"      1   79   1
"F3" "SS #"      1   80   1
"F4" "SS #"      1   81   1
"F5" "SS #"      1   82   1
"F6" "SS #"      1   83   1
"F7" "SS #"      1   84   1
"F8" "SS #"      1   85   1
"F9" "SS #"      1   86   1
"F>" "SS #"      1   25   3
"F<" "SS #"      1   16   2
CONSONANT
```

Figure 16.4

```
"G"  "GAX #"     1   32   3
"G"  "GAX #"     1   24   2
"G"  "GAX #"     1   15   1
SILENCE
"G1" "SS  #"     1   87   1
"G2" "SS  #"     1   88   1
"G3" "SS  #"     1   89   1
"G4" "SS  #"     1   90   1
"G5" "SS  #"     1   91   1
"G6" "SS  #"     1   92   1
"G7" "SS  #"     1   93   1
"G8" "SS  #"     1   94   1
"G9" "SS  #"     1   95   1
"G>" "SS  #"     1   32   3
"G<" "SS  #"     1   24   2
"H1" "SS  #"     1   96   1
"H2" "SS  #"     1   97   1
"H3" "SS  #"     1   98   1
"H4" "SS  #"     1   99   1
"H5" "SS  #"     1  100   1
"H6" "SS  #"     1  101   1
"H7" "SS  #"     1  102   1
"H8" "SS  #"     1  103   1
"H9" "SS  #"     1  104   1
"H>" "SS  #"     1    9   3
"H<" "SS  #"     1    6   2
VOWELS 3
"IH" "IH #"      1    6   2  /*  'i'  in bit      */
"IL" "IL #"      2    6   2    1   23   1
"IM" "IM #"      2    6   2    1   17   1
"IN" "IN #"      2    6   2    1   20   1
"IX" "IX #"      1    6   2  /*  'i'  in solid    */
"IY" "IY #"      1    8   2  /*  'ee' in beet     */
CONSONANT
"J"  "JAX #"     1   30   3
"J"  "JAX #"     1   22   2
"J"  "JAX #"     1   13   1
SILENCE
"J1" "SS  #"     1  105   1
"J2" "SS  #"     1  106   1
"J3" "SS  #"     1  107   1
"J4" "SS  #"     1  108   1
"J5" "SS  #"     1  109   1
"J6" "SS  #"     1  110   1
"J7" "SS  #"     1  111   1
"J8" "SS  #"     1  112   1
"J9" "SS  #"     1  113   1
"J>" "SS  #"     1   30   3
"J<" "SS  #"     1   22   2
CONSONANT
"K"  "KAX #"     1   32   3
"K"  "KAX #"     1   24   2
```

Figure 16.5

```
"X"  "KAX #"        1   15    1
SILENCE
"X1" "SS #"         1  114    1
"X2" "SS #"         1  115    1
"X3" "SS #"         1  116    1
"X4" "SS #"         1  117    1
"X5" "SS #"         1  118    1
"X6" "SS #"         1  119    1
"X7" "SS #"         1  120    1
CONSONANT
"L"  "LXLX #"       1   31    3
"L"  "LXLX #"       1   23    2
"L"  "LXLX #"       1   14    1
SILENCE
"L>" "SS #"         1   31    3
"L<" "SS #"         1   23    2
CONSONANT
"LX" "LXLX #"       1   31    3
"LX" "LXLX #"       1   23    2
"LX" "LXLX #"       1   14    1
"M"  "MMM #"        1   26    3
"M"  "MMM #"        1   17    2
"M"  "MMM #"        1    3    1
"N"  "NN #"         1   28    3
"N"  "NN #"         1   20    2
"N"  "NN #"         1   11    1
"NX" "NNQXGAX #"    1   32    3
"NX" "NNQXGAX #"    1   24    2
"NX" "NNQXGAX #"    1   15    1
VOWELS 3
"OH" "OH #"         1    9    3   /* 'o' in border    */
"OW" "OW #"         6    9    3   /* 'ow' in boat    */
                    1    5    3
"OY" "OY #"         6    9    3   /* 'o' in boil     */
                    1    6    2   /* 'i' in boil     */
CONSONANT
"P"  "PAX #"        1   26    3
"P"  "PAX #"        1   17    2
"P"  "PAX #"        1    3    1
"Q"  "Q #"          1    5    3
"Q"  "Q #"          1   18    2
"Q"  "Q #"          1    4    1
"QX" "QX #"         1    5    3
"QX" "QX #"         1   18    2
"QX" "QX #"         1    4    1
"R"  "RR #"         1    5    3
"R"  "RR #"         1   18    2
"R"  "RR #"         1    4    1
SILENCE
"R>" "SS #"         1    5    3
"R<" "SS #"         1   18    2
CONSONANT
```

Figure 16.6

```
"RX"  "R #"      1   5   3
"RX"  "R #"      1  18   2
"RX"  "R #"      1   4   1
 "S"  "SS #"     1  27   3
 "S"  "SS #"     1  19   2
 "S"  "SS #"     1  10   1
SILENCE
"S>"  "SS #"     1  27   3
"S<"  "SS #"     1  19   2
CONSONANT
"SH"  "SH #"     1  30   3
"SH"  "SH #"     1  22   2
"SH"  "SH #"     1  13   1
 "T"  "TAX #"    1  28   3
 "T"  "TAX #"    1  20   2
 "T"  "TAX #"    1  11   1
SILENCE
"T>"  "SS #"     1  29   3
"T<"  "SS #"     1  21   2
CONSONANT
"TH"  "THAX #"   1  29   3
"TH"  "THAX #"   1  21   2
"TH"  "THAX #"   1  12   1
VOWELS 3
"UH"  "UH #"     1   9   3   /* 'oo' in book    */
"UL"  "UL #"     3   6   1   1  14   1
"UM"  "UM #"     3   6   1   1   3   1
"UN"  "UN #"     3   6   1   1  11   1
"UW"  "UW #"     1   5   3   /* 'oo' in boot   */
"UX"  "UX #"     1   5   3   /*               */
CONSONANT
"V"   "VAX #"    1  25   3
"V"   "VAX #"    1  16   2
"V"   "VAX #"    1   2   1
"W"   "WUH #"    1   5   3
"W"   "WUH #"    1   5   2
"W"   "WUH #"    1   5   1
"WH"  "WUH #"    1   5   3
"WH"  "WUH #"    1   5   2
"WH"  "WUH #"    1   5   1
"Y"   "YAX #"    1  32   3
"Y"   "YAX #"    1  24   2
"Y"   "YAX #"    1  15   1
SILENCE
"Y>"  "SS #"     1  32   3
"Y<"  "SS #"     1  24   2
CONSONANT
"Z"   "ZZZ #"    1  27   3
"Z"   "ZZZ #"    1  19   2
"Z"   "ZZZ #"    1  10   1
SILENCE
"Z>"  "ZHAX #"   1  30   3
```

Figure 16.7

```
"Z<" "ZHAX #"      1    22    2
CONSONANT
"ZH" "ZHAX #       1    30    3
"ZH" "ZHAX #       1    22    2
"ZH" "ZHAX #       1    13    1
LIPPARAMS      160    128    16    16    ;
ACTOR 3
ENDVOICE "FACE1.IMG"
         :
```

Figure 17

Copyright 1990 Bright Star Technology, Inc.

All Rights Reserved

```
/* ccVV XXXX VV#n xxxx xxxx VVkk */
first_occurrance = (*(int*)phoneme);
phoneme += 2;
this_occurrance = (*(int*)phoneme);
while ((*phoneme != 0) && (first_occurrance != this_occurrance)) {
    phoneme++;
    this_occurrance = (*(int*)phoneme);
} /* while */ if    (   (*(phoneme+2) == 'R')
       || (*(phoneme+2) == '#')) {
    phoneme +=2;
    this_occurrance = (*(int*)phoneme);
    while ((*phoneme != 0) && (first_occurrance != this_occurrance)) {
        phoneme++;
        this_occurrance = (*(int*)phoneme);
    } /* while */
} /* if */ if   (  (this_occurrance == first_occurrance)
     && (*(phoneme-1) == ' ')) {
    (*(int*)phoneme) = substitute;
}
OSErr s_get_reconciled_bt_phonemes (
/* - - - - - - P A R A M E T E R S - - - - - - */
    Handle *returnValue)
/* - - - - - - - B E G I N - - - - - - - - - - */
{ /* begin s_get_reconciled_bt_phonemes */
/* - - - - - L O C A L   S T A T I C S - - - - */
    static long reconciliation_phonemes [TOTAL_RECONCILED_PHONEMES+2]
                = { TOTAL_RECONCILED_PHONEMES,
                    '\0010\0\0',
                    '\0011\0\0',
                    '\0012\0\0',
                    '\0013\0\0',
                    '\0014\0\0',
                    '\0015\0\0',
                    '\0016\0\0',
                    '\0017\0\0',
                    '\18\0\0',
                    '\19\0\0',
                    '\1!\0\0',
                    '\1#\0\0',
                    '\2#0\0',
                    '\2#1\0',
                    '\2#2\0',
                    '\2#3\0',
                    '\2#4\0',
                    '\2#5\0',
```

```
                    '\2R1\0',
                    '\2R2\0',
                    '\2R3\0',
                    '\2R4\0',
                    '\2R5\0',
                    '\2R6\0',
                    '\2R7\0',
                    '\2R8\0',
                    '\2R9\0',
                    '\2R#\0',
                    '\2RX\0',
                    '\1S\0\0',
                    '\2S#\0',
                    '\2SH\0',
                    '\1T\0\0',
                    '\2T#\0',
                    '\2TH\0',
                    '\2UE\0',
                    '\2UH\0',
                    '\2UL\0',
                    '\2UM\0',
                    '\2UN\0',
                    '\2UW\0',
                    '\2UX\0',
                    '\1V\0\0',
                    '\2V#\0',
                    '\1W\0\0',
                    '\2W#\0',
                    '\2WH\0',
                    '\1Y\0\0',
                    '\2Y#\0',
                    '\1Z\0\0',
                    '\2Z#\0',
                    '\2ZH\0',
                    0L};
/* - - - - - - - - - B O D Y - - - - - - - - - - - - */
    *returnValue = (Handle)reconciliation_phonemes;
/* - - - - - - - - - R E T U R N - - - - - - - - - - */
OSErr s_get_generic_bt_phonemes (
/* - - - - - - P A R A M E T E R S - - - - - - - - - */
    Handle *returnValue)
/* - - - - - - - - - B E G I N - - - - - - - - - - - */
    { /* begin s_get_generic_bt_phonemes */
#define SPACE_CODE  ('\1 \0\0')
/* - - - - - L O C A L   S T A T I C S - - - - - - - */
    static long  generic_phonemes_table [TOTAL_RECONCILED_PHONEMES+2]
                = { TOTAL_RECONCILED_PHONEMES,
                    SPACE_CODE,
                    SPACE_CODE,
                    SPACE_CODE,
                    SPACE_CODE,
                    SPACE_CODE,
```

Figure 17.5

SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
'\1,\0\0',
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
'\1,\0\0',
SPACE_CODE,
'\1,\0\0',
'\1?\0\0',
SPACE_CODE,
SPACE_CODE,

Figure 17.6

```
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
'\2/C\0',
'\2/H\0',
'\2A0\0',
'\2AA\0',
'\2AE\0',
'\2AH\0',
'\2AO\0',
'\2AW\0',
'\2AX\0',
'\2AY\0',
'\1B\0\0',
'\1B\0\0',
'\2CH\0',
'\1D\0\0',
'\1D\0\0',
'\2DH\0',
'\2DX\0',
'\2EH\0',
'\2ER\0',
'\2EY\0',
'\2EH\0',
'\1F\0\0',
'\1F\0\0',
'\1G\0\0',
'\1G\0\0',
'\2IH\0',
'\2IL\0',
'\2IM\0',
'\2IN\0',
'\2IX\0',
'\2IY\0',
'\1J\0\0',
'\1J\0\0',
'\1K\0\0',
'\1K\0\0',
'\1L\0\0',
'\1L\0\0',
'\2LX\0',
'\1M\0\0',
'\1M\0\0',
'\1N\0\0',
'\1N\0\0',
SPACE_CODE
```

Figure 17.7

```
'\2NX\0',
'\2OH\0',
'\2OH\0',
'\2OW\0',
'\2OH\0',
'\2OY\0',
'\1P\0\0',
'\1P\0\0',
'\1Q\0\0',
'\1Q\0\0',
SPACE_CODE,
'\1R\0\0',
SPACE_CODE,
SPACE_CODE,
SPACE_CODE,
SPACE_CODE,
SPACE_CODE,
SPACE_CODE,
SPACE_CODE,
SPACE_CODE,
SPACE_CODE,
'\1R\0\0',
'\2RX\0',
'\1S\0\0',
'\1S\0\0',
'\2SH\0',
'\1T\0\0',
'\1T\0\0',
'\2TH\0',
'\2UX\0',
'\2UH\0',
'\2UL\0',
'\2UM\0',
'\2UN\0',
'\2UW\0',
'\2UX\0',
'\1V\0\0',
'\1V\0\0',
'\1W\0\0',
'\1W\0\0',
'\2WH\0',
'\1Y\0\0',
'\1Y\0\0',
'\1Z\0\0',
'\1Z\0\0',
'\2ZH\0',
0L};
/* - - - - - - - - - B O D Y - - - - - - - - - - - */
    *returnValue = (Handle)generic_phonemes_table;
/* - - - - - - - - - R E T U R N - - - - - - - - - */
    return (noErr);
```

Figure 17.8

```
/* - - - - - - - - - - E N D - - - - - - - - - - - */
    } /* end s_get_generic_bt_phonemes */
/****************** E N D  O F  P R O C E D U R E ****************/
OSErr s_pre_bt_phoneme_substituions (
/* - - - - - - P A R A M E T E R S - - - - - - - - */
    char    *phoneme)
/* - - - - - - - - B E G I N - - - - - - - - - - - */
    ( /* begin s_pre_bt_phonemes_substitions */
/* - - - - - - - - - B O D Y - - - - - - - - - - - */
        /* ccVV xxxx VV#n xxxx xxxx VVkk */
        if (*(phoneme-1) != ' ') {
            /* Previous character is not a vowel! */
            switch (*(int*)phoneme) {
                /****************************************************/
                /* RJB 3-13-90 Substitute first occurrance of a diphthong */
                /*              with the first image of the diphthong.  */
                /****************************************************/
                case 'AW':
                        search_and_sub (phoneme, 'UX');
                        *(int*)phoneme = 'AO';
                        break;
                case 'AY':
                        search_and_sub (phoneme, 'IH');
                        *(int*)phoneme = 'AO';
                        break;
                case 'OW':
                        search_and_sub (phoneme, 'UX');
                        *(int*)phoneme = 'OH';
                        break;
                case 'OY':
                        search_and_sub (phoneme, 'IH');
                        *(int*)phoneme = 'OH';
                        break;

default:
                    break;
            } /* end switch */
        } /* if */
/* - - - - - - - - R E T U R N - - - - - - - - - - */
    return (noErr);
/* - - - - - - - - - E N D - - - - - - - - - - - - */
    } /* end s_pre_bt_phoneme_substitutions */
/****************** E N D  O F  P R O C E D U R E ****************/
/****************************************************************/
/******************* E N D   E X P O R T S *********************/
/****************************************************************/
```

Figure 18

"C" Code for CD-ROM Out

Copyright 1990 Bright Star Technology, Inc.

All Rights Reserved

```
/*
    Start the CD playing if a) we are doing a RECITE or b) we are doing an EXP
    and the disk is not playing (status !=0). If we start it playing, we need
    to synch to the SECOND block of the play because the AppleCD driver report
    that it is at the APlaqy location long before it gets there. This sould
    not be a big deal because blocks are 1/75 s apart and we run at 1/60 s max
/*
zCDROM_AStatus (h_CD_dRefNum, &status);
if (recite_command || (status != 0)) {
    minute = (startBlock / BLOCKMIN);
    second = (startBlock % BLOCKMIN) / BLOCKSEC;
    block  = (startBlock % BLOCKSEC);
    atMinute = DECIMAL2BCD (minute);
    atSecond = DECIMAL2BCD (second);
    atBlock  = DECIMAL2BCD (block);
    if (zCDROM_APlay (STEREO, h_CD_dRefNum, atMinute, atSecond, atBlock))
        startBlock = -1;             /* Failed */
    else startBlock++;               /* Success */
} /* if */
/*
    Wait for the sync location to go by. We also check for a) disk not
    playing (status != 0), b) animation interrupted or c) past sync point to
    make sure we don't loop endlessly.
*/
do {
   if (zCDROM_AStatus (h_CD_dRefNum, &status) || status) break;
   if (zCDROM_BCDPosition (h_CD_dRefNum, &atMinute, & atSecond, &atBlock)) break;
   atCount = BCD2DECINAL(atMinute) * BLOCKMIN +
             BCD2DECINAL(atSecond) * BLOCKSEC +
             BCD2DECINAL(atBlock);
   } while ((atCount < startBlock) && (!B_INTERRUPTED));
if (s_bumper_proc) s_bumper_proc ();
```

Figure 19
CD Synchronization

Copyright 1990 Bright Star Technology, Inc.

All Rights Reserved

```
on mouseUp
  put cd fld "m"&&cd fld "s"&&cd fld "b" into playInfo
  if the visible of cd grc "play" then
    CDPause
    put CDElapsed() into info
    put item 2 of info into cd fld "em"
    put item 3 of info into cd fld "es"
    put item 4 of info into cd fld "eb"
    put cd fld "em"&&cd fld "es"&&cd fld "eb" into stopInfo
    RAVE "{CD STOP"&&stopInfo&"}"
    lock screen
    hide cd grc "play"
    show cd grc "stop"
  else
    if cd fld "em" <> "." then
      put cd fld "em"&&cd fld "es"&&cd fld "eb" into stopInfo
      RAVE "{CD STOP"&&stopInfo&"}"
    end if
    RAVE "{CD PLAY"&&playInfo&"}"
    lock screen
    hide cd grc "stop"
    show cd grc "play"
    unlock screen
    repeat while CDStatus() is 1
      if the visible of cd grc "stop" then
        lock screen
        hide cd grc "stop"
        show cd grc "play"
        unlock screen
      else
        lock screen
        hide cd grc "play"
        show cd grc "stop"
        unlock screen
      end if
```

Figure 19.2

```
            if the mouseClick then
               CDPause
               put CDElapsed() into info
               put item 2 of info into cd fld "em"
               put item 3 of info into cd fld "es"
               put item 4 of info into cd fld "eb"
               put cd fld "em"&&cd fld "es"&&cd fld "eb" into stopInfo
               RAVE "{CD STOP"&&stopInfo&"}"
               exit repeat
            end if
         end repeat
         lock screen
         hide cd grc "play"
         show cd grc "stop"
         unlock screen
      end if
   end mouseUp
   on mouseDown
      repeat until the mouse is up
         if cd fld ID 116 = 75 then
            put 0 into cd fld ID 116
            if cd fld ID 115 = 59 then
               put 0 into cd fld ID 115
               add 1 to cd fld ID 114
            else
               add 1 to cd fld ID 115
            end if
         else
            add 1 to cd fld ID 116
         end if
      end repeat
   end mouseDown
   on mouseDown
      repeat until the mouse is up
         if cd fld ID 116 = 0 then
            put 75 into cd fld ID 116
            if cd fld ID 115 = 0 then
```

Figure 19.3

```
            put 59 into cd fld ID 115
            subtract 1 from cd fld ID 114
          else
            subtract 1 from cd fld ID 115
          end if
        else
          subtract 1 from cd fld ID 116
        end if
      end repeat
    end mouseDown
    on mouseUp
      lock screen
      if the shiftKey is down then
          put cd fld "em" into cd fld "m"
          put cd fld "es" into cd fld "s"
          put cd fld "eb" into cd fld "b"
      else
          put cd fld "m" into cd fld "em"
          put cd fld "s" into cd fld "es"
          put cd fld "b" into cd fld "eb"
      end if
      unlock screen
    end mouseUp
```

ADVANCED TOOLS FOR SPEECH SYNCHRONIZED ANIMATION

This application is a divisional application of application Ser. No. 08/065,704, abandoned filed May 20, 1993, which is a continuation of application Ser. No. 07/657,714, filed Feb. 19, 1991, abandoned.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention relates generally to computerized animation methods and, more specifically to a method and apparatus for creation and control of random access sound-synchronized talking synthetic actors and animated characters.

It is well-known in the prior art to provide video entertainment or teaching tools employing time synchronized sequences of pre-recorded video and audio. The prior art is best exemplified by tracing the history of the motion picture and entertainment industry from the development of the "talkies" to the recent development of viewer interactive movies.

In the late nineteenth century the first practical motion pictures comprising pre-recorded sequential frames projected onto a screen at 20 to 30 frames per second to give the effect of motion were developed. In the 1920's techniques to synchronize a pre-recorded audio sequence or sound track with the motion picture were developed. In the 1930's animation techniques were developed to produce hand drawn cartoon animations including animated figures having lip movements synchronized with an accompanying pre-recorded soundtrack. With the advent of computers, more and more effort has been channeled towards the development of computer generated video and speech including electronic devices to synthesize human speech and speech recognition systems.

In a paper entitled "KARMA: A system for Storyboard Animation" authored by F. Gracer and M. W. Blasgen, IBM Research Report RC 3052, dated Sep. 21, 1970, an interactive computer graphics program which automatically produces the intermediate frames between a beginning and ending frame is disclosed. The intermediate frames are calculated using linear interpolation techniques and then produced on a plotter. In a paper entitled "Method for Computer Animation of Lip Movements", IBM Technical Disclosure Bulletin, Vol. 14 No. 10 March, 1972, pages 5039, 3040, J. D. Bagley and F. Gracer disclosed a technique for computer generated lip animation for use in a computer animation system. A speech-processing system converts a lexical presentation of a script into a string of phonemes and matches it with an input stream of corresponding live speech to produce timing data. A computer animation system, such as that described hereinabove, given the visual data for each speech sound, generates intermediate frames to provide a smooth transition from one visual image to the next to produce smooth animation. Finally the timing data is utilized to correlate the phonetic string with the visual images to produce accurately timed sequences of visually correlated speech events.

Recent developments in the motion picture and entertainment industry relate to active viewer participation as exemplified by video arcade games and branching movies. U.S. Pat. Nos. 4,305,131; 4,333,152; 4,445,187 and 4,569,026 relate to remote-controlled video disc devices providing branching movies in which the viewer may actively influence the course of a movie or video game story. U.S. Pat. No. 4,569,026 entitled "TV Movies That Talk Back" issued on Feb. 4, 1986 to Robert M. Best discloses a video game entertainment system by which one or more human viewers may vocally or manually influence the course of a video game story or movie and conduct a simulated two-way voice conversation with characters in the game or movie. The system comprises a special-purpose microcomputer coupled to a conventional television receiver and a random-access videodisc reader which includes automatic track seeking and tracking means. One or more hand-held input devices each including a microphone and visual display are also coupled to the microcomputer. The microcomputer controls retrieval of information from the videodisc and processes viewers' commands input either vocally or manually through the input devices and provides audio and video data to the television receiver for display. At frequent branch points in the game, a host of predetermined choices and responses are presented to the viewer. The viewer may respond using representative code words either vocally or manually or a combination of both. In response to the viewer's choice, the microprocessor manipulates pre-recorded video and audio sequences to present a selected scene or course of action and menu.

In a paper entitled "Soft Machine: A Personable Interface", "Graphics Interface '84", John Lewis and Patrick Purcell disclose a system which simulates spoken conversation between a user and an electronic conversational partner. An animated person-likeness "speaks" with a speech synthesizer and "listens" with a speech recognition device. The audio output of the speech synthesizer is simultaneously coupled to a speaker and to a separate real-time format-tracking speech processor computer to be analyzed to provide timing data for lip synchronization and limited expression and head movements. A set of pre-recorded visual images depicting lip, eye and head positions are properly sequenced so that the animated person-likeness "speaks" or "listens". The output of the speech recognition device is matched against pre-recorded patterns until a match is found. Once a match is found, one of several pre-recorded responses is either spoken or executed by the animated person-likeness.

Both J. D. Bagley et al and John Lewis et al require a separate format-tracking speech processor computer to analyze the audio signal to provide real-time data to determine which visual image or images should be presented to the user. The requirement for this additional computer adds cost and complexity to the system and introduces an additional source of error. Further, neither Bagley et al nor Lewis address techniques and processes for constructing authoring systems.

SUMMARY OF THE INVENTION

The present invention provides a method and apparatus for a random access animation user interface environment referred to as interFACE, which enables a user to cream and control animated lip-synchronized images or objects utilizing a personal computer, and incorporate them into their own programs and products. The present invention may be utilized as a general purpose learning tool, interface device between a user and a computer, in video games, in motion pictures and in commercial applications such as advertising, information kiosks and telecommunications. Utilizing a real-time random-access interface driver (RAVE) together with a descriptive authoring language called RAVEL (real-time random-access animation and vivification engine language), synthesized actors, hereinafter referred to as "synactors", representing real or imaginary persons and animated characters, objects or scenes can be created and programmed to perform actions including speech which are not sequentially pre-stored records of previously enacted events. Animation and sound synchronization are produced automatically and in real-time.

The communications patterns—the sounds and visual images of a real or imaginary person or of an animated character associated with those sounds—are input to the system and decomposed into constituent parts to produce fragmentary images and sounds. Alternatively, or in conjunction with this, well known speech synthesis methods may also be employed to provide the audio. That set of communications characteristics is then utilized to define a digital model of the motions and sounds of a particular synactor or animated character. A synactor that represents the particular person or animated character is defined by a RAVEL table containing the coded instructions for dynamically accessing and combining the video and audio characteristics to produce real-time sound and video coordinated presentations of the language patterns and other behavior characteristics associated with that person or animated character. The synactor can then perform actions and read or say words or sentences which were not prerecorded actions of the person or character that the synactor models. Utilizing these techniques, a synactor may be defined to portray a famous person or other character, a member of one's family or a friend or even oneself.

In the preferred embodiment, interFACE, a general purpose system for random access and display of synactor images on a frame-by-frame basis that is organized and synchronized with sound is provided. Utilizing the interFACE system, animation and sound synchronization of a synactor is produced automatically and in real time. In the preferred embodiment, each synactor is made up of as many as 120 images, between 8 and 32 of which are devoted to speaking and 8 to animated expressions.

The speaking images correspond to distinct speech articulations and are sufficient to create realistic synthetic speaking synactors. The remaining images allow the synactor to display life-like expressions. Smiles, frowns and head turns can all be incorporated into the synactor's appearance.

The interFACE system provides the capability to use both synthetic speech and/or digitized recording to provide the speech for the synactors. Speech synthesizers can provide unlimited vocabulary while utilizing very little memory. To make a synactor speak, the text to be spoken is typed on a computer keyboard or otherwise input to the system. The input text is first broken down into its phonetic components. Then the sound corresponding to each component is generated through a speaker as an image of the synactor corresponding to that component is simultaneously presented on the display device. Digitized recording provides digital data representing actual recorded sounds which can be utilized in a computer system. Utilizing a "synchronization lab" defined by the interFACE system, a synactor can speak with any digitized sound or voice that is desired. The preferred embodiment allows both experienced and novice users to understand and operate the interFACE system for creating, editing and working with the synactors.

The Dressing Room is where synactors are created and edited and is where users—and synactors—spend most of their time. The Dressing Room comprises menus and tools which allow the user to navigate between synactor images by pressing or clicking with a mouse or other input device. Within the Dressing Room, the image of the synactor is placed in a screen area referred to as the synactor Easel. Utilizing "paint tools" or "face clip art", the user can create and edit a synactor. With a paint tool, a synactor may be drawn from scratch or, with clip art, a synactor may be created by copying and "pasting" eyes, ears, noses and even mouths selected from prestored sets of the different features. In addition to providing fundamental paint tools, the dressing room provides import/export ability, synactor resize/conversion commands and a variety of animation tools. The tools incorporated within the dressing room are simple enough to allow a user to easily generate simple cartoons and yet powerful enough to create complex animation.

Once a synactor has been created or built in the dressing room, the synactor is transferred to a Stage screen where audio/lip synchronization and animation of the synactor can be observed. The stage screen includes a text field wherein a user can enter text and observe the synactor speak the entered text. If the synactor thus created needs additional work, the user can return the synactor to the dressing room for touchup. If the user is satisfied with the synactor, the synactor can then be saved to memory for future use.

In the interFACE system, the synactor file is manipulated like a document in any application. Opening (transferring a synactor file to the dressing room), editing and deleting synactors from memory is accomplished from menus and other control tools. Sound resources comprising digitized sounds are also copied and deleted from windows. The digitized sound resources are synchronized with the image of the synactor in a mode referred to as the interFACE speech synchronization lab (Speech Sync Lab). The Speech Sync Lab examines the sound and automatically creates a phonetic string which is used to create the animation and sound synchronization of the synactor. The Speech Sync Lab provides several complementary methods which allows a user, either automatically or manually, to generate, edit and optimize a RECITE command. The RECITE command identifies for the RAVE driver both the sound resource to use and the phonetic string including associated timing values which produces the desired animation of the associated synactor. The Speech Sync Lab also provides for testing and refinement of the animation. If the resulting synchronization is not correct, the user can modify the RECITE command manually.

The above described functions and screens are coordinated together and accessed via menus and a "navigation palette". The navigational palette or window includes four screen buttons providing a user easy navigation through the various screens of the interFACE system features and online help system.

The RAVE driver is responsible for the animation and sound synchronization of the synactors. RAVEL defines and describes the synactor while the RAVE scripting language is an active language which controls the synactor after it has been created by a user. RAVE scripting language commands enable a programmer to control the RAVE driver for use with an application program created by a programmer utilizing a desired programming system. Utilizing facilities provided in the programming system to call external functions, the programmer invokes the RAVE system and passes RAVE scripting language commands as parameters to it. A RAVE script command controller interprets these commands to provide control of the synactor.

When a synactor has been created, it is controlled in an application program by scripts through the RAVE scripting language. All of the onscreen animation is controlled by scripts in the host system through the RAVE scripting language. Various subroutines referred to as external commands ("XCMD") or external functions ("XFCN") are utilized to perform functions not available in the host language, for example creating synactors from the dressing room. The RAVE XCMD processes information between the RAVE scripts and the RAVE driver. Separate commands are utilized to enable users to open, close, move, hide or show the synactor and to cause the synactor to speak. An application program may have these commands built in, selected among or generated by the RAVE driver itself at runtime.

The interFACE system of the present invention provides a user with the capability to quickly and efficiently create advanced animated talking agents (synactors) to provide an interface between users and computers.

BRIEF DESCRIPTION OF THE DRAWING

A fuller understanding of the present invention and of its features and advantages will become apparent from the following detailed description taken in conjunction with the accompanying drawing which forms a part of the specification and in which:

FIGS. 9a–9k are detailed screen presentations illustrating various menus and screen windows of the system shown in FIG. 4;

FIG. 11 illustrates selected speaking images correlated with speech samples for animation according to the principles of the present invention;

FIGS. 14 and 14.2–14.5 are a source code program listing for a standard synactor in accordance with the present invention;

FIGS. 15 and 15.2–15.4 are a source code program listing for an extended synactor in accordance with the present invention;

FIGS. 16 and 16.2–16.7 are a source code program listing for a coarticulated synactor in accordance with the present invention;

FIGS. 17 and 17.2–17.8 illustrate voice reconciliation phoneme table and generic phoneme tables in accordance with the present invention;

FIG. 18 is a listing of microprocessor instructions for a CD-ROM in accordance with the present invention; and FIGS. 19 and 19.2–19.3 are a script flow for CD synchronization in accordance with the present invention.

DETAILED DESCRIPTION OF THE PREFERRED EMBODIMENT

Figure 1:
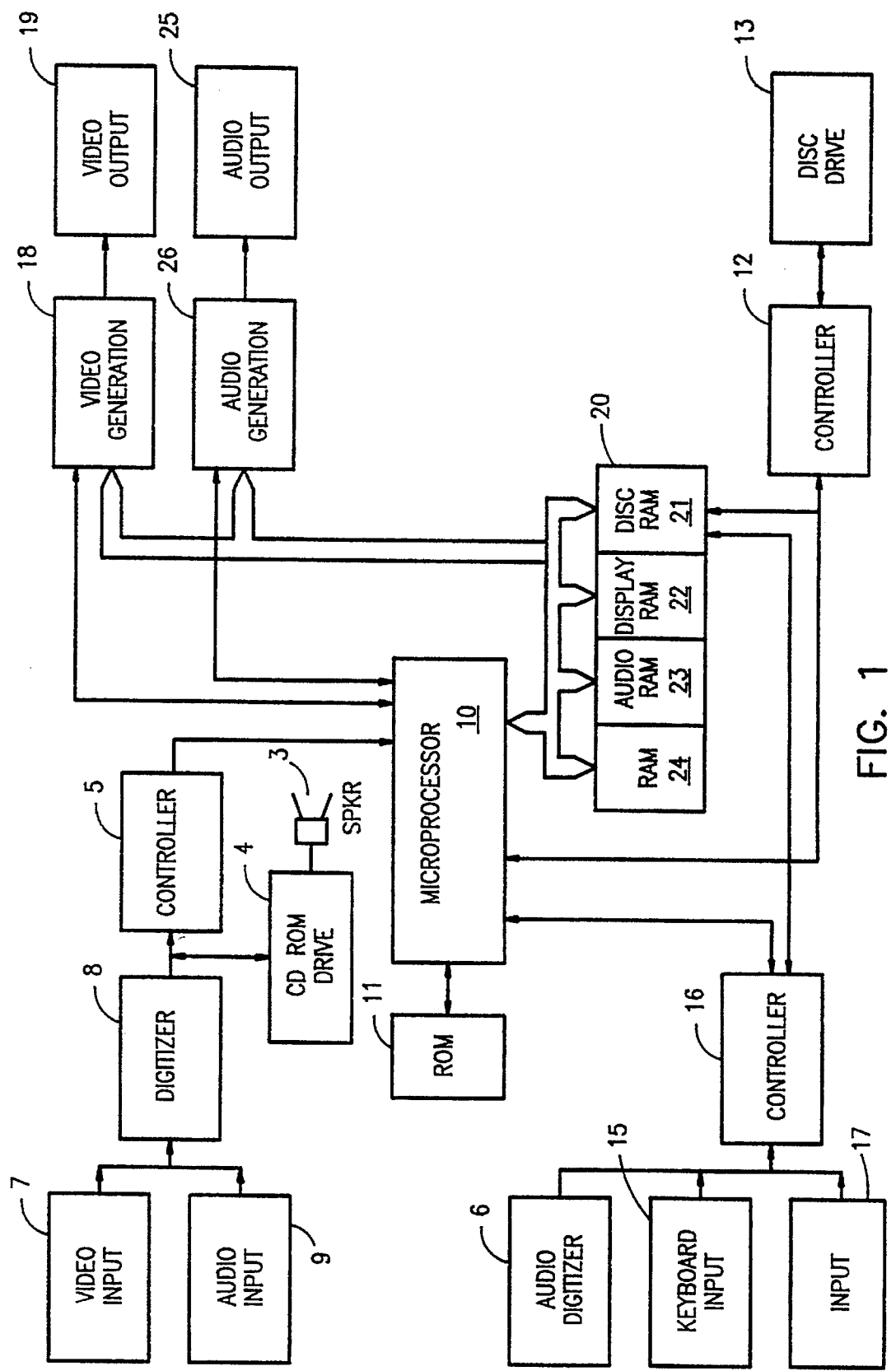
FIG. 1 is a block diagram of a system which displays computer generated visual images with real time synchronized computer generated speech according to the principles of the present invention.

Referring now to FIG. 1, in one preferred embodiment of the present invention, a special purpose microcomputer comprises a program-controlled microprocessor 10 (a Motorola MC68000 is suitable for this purpose), random-access memory (RAM) 20, read-only memory (ROM) 11, disc drive 13, video and audio input devices 7 and 9 and user input devices such as keyboard 15 or other input devices 17 and output devices such as video display 19, audio output device 25 and CD-ROM drive 4 and its associated speaker 3. RAM 20 is divided into at least four blocks which are shared by the microprocessor 10 and the various input and output devices.

The video output device 19 may be any visual output device such as a conventional television set or the CRT monitor for a personal computer. The video output 19 and video generation 18 circuitry are controlled by the microprocessor 10 and share display RAM buffer space 22 to store and access memory mapped video The video generation circuits also provide a 60 Hz timing signal interrupt to the microprocessor 10.

Also sharing the audio RAM buffer space 23 with the microprocessor 10 is the audio generation circuitry 26 which drives the audio output device 25. Audio output device 25 may be a speaker or some other type of audio transducer such as a vibrator to transmit to the hearing impaired.

Disc controller 12 shares the disc RAM 21 with the microprocessor 10 and provides control reading from and writing to a suitable non-volatile mass storage medium, such as floppy disc drive 13, for long-term storing of synactors that have been created using the interFACE system and to allow transfer of synactor resources between machines.

Input controller 16 for the keyboard 15 and other input devices 17 is coupled to microprocessor 10 and also shares disc RAM 21 with the disc controller 12. This purpose may be served by a Synertek SY6522 Versatile Interface Adaptor. Input controller 16 also coordinates certain tasks among the various controllers and other microprocessor support circuitry (not shown). A pointing input device 17 such as a mouse or light pen is the preferred input device because it allows maximum interaction by the user. Keyboard 15 is an optional input device in the preferred embodiment, but in other embodiments may function as the pointing device, or be utilized by an instructor or programmer to create or modify instructional programs or set other adjustable parameters of the system. Other pointing and control input devices such as a joy stick, a finger tip (in the case of a much screen) or an eye-motion sensor are also suitable. An audio digitizer 6 such as a MacRecorder, available from Farallon Computing, Inc., to provide pre-digitized sound samples to the microprocessor may also be coupled to the input controller 16.

RAM 24 is the working memory for the microprocessor 10. The RAM 24 contains the system and applications programs and other information required by the microprocessor 10. Microprocessor 10 also accesses ROM 11 which is the system's permanent read-only memory. ROM 11 contains the operational routines and subroutines required by the microprocessor 10 operating system, such as the routines to facilitate disc and other device I/O, graphics primitives and real time task management, etc. These routines may be additionally supported by extensions and patches in RAM 24 and on disc.

Controller 5 is a serial communications controller such as a Zilog Z8530 SCC chip. Digitized samples of video and audio may be input into the system in this manner to provide characteristics for the animated characters and sound resources for synthesized speech. Digitizer 8 comprises an audio digitizer and a video digitizer coupled to the video and audio inputs 7 and 9, respectively. Standard microphones, video cameras and VCRs will serve as input devices. These input devices are optional since digitized video and audio samples may be input into the system by keyboard 15 or disc drive 13 or may be resident in ROM 11. Controller 5 may also control a CD-ROM drive 4 and its associated independent speaker 3.

Figure 2:
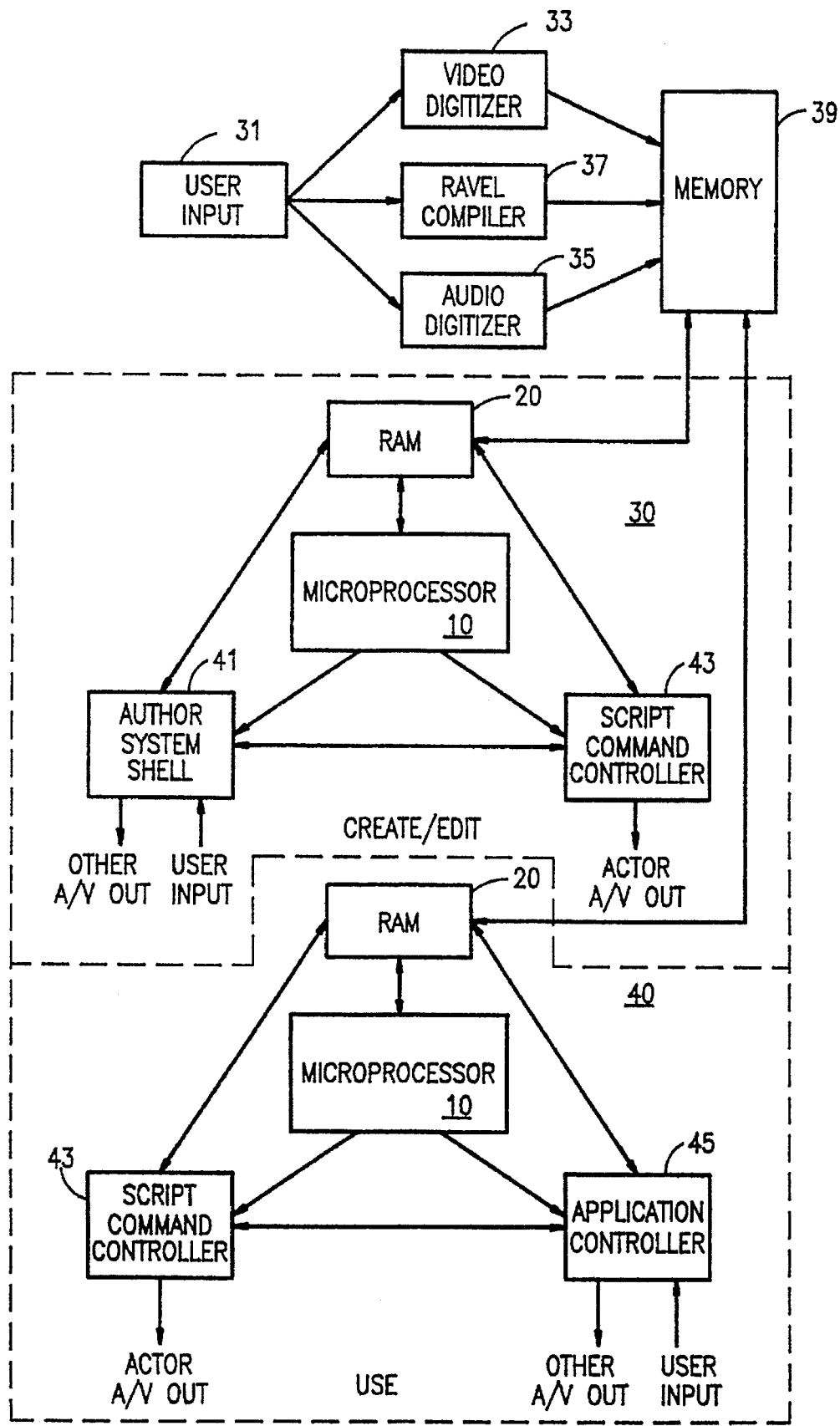
FIG. 2 is a conceptual block diagram illustrating the interFACE synchronized animation system as implemented in the system shown in FIG. 1.

Referring now also to FIG. 2, a conceptual block diagram of the animated synthesized actor, hereinafter referred to as synactor, editing or authoring and application system according to the principles of the present invention is shown. The animation system of the present invention, hereinafter referred to as "interFACE", is a general purpose system which provides a user with the capability to create and/or edit synactors and corresponding speech scripts and to display on a frame-by-frame basis the synactors thus created. The interFACE system provides animation and sound synchronization automatically and in real time. To accomplish this, the interFACE system interfaces with a real time random access driver (hereinafter referred to as "RAVE") together with a descriptive authoring language (hereinafter referred to as "RAVEL") which is implemented by the system shown in FIG. 1.

Prototype models for the types of synactors to be edited by the authoring system are input via various input devices 31. The prototype models may comprise raw video data which is convened to digital data in video digitizer 33 or other program data which is compiled by a RAVEL compiler 37. The prototype synactors are saved in individual synactor fries identified by the name of the corresponding synactor. The synactor files are stored in memory 39 for access by the interFACE system as required. Memory 39 may be a disk storage or other suitable peripheral storage device.

To create a new synactor or to edit an existing prototype synactor, the interFACE system is configured as shown by the blocks included in the create/edit block 30. The author system shell 41 allows the user to access any synactor file via RAM 20 and display the synactor and its images in a number of screen windows which will be described in detail hereinbelow. Utilizing the various tools provided, and the script command controller 43, the user is able to create a specific synactor and/or create and test speech and behavior scripts for use in a specific application program. The new synactor thus created may be saved in the original file or in a new file identified by a name for the new synactor. The synactor is saved as a part of a file called a resource. The microprocessor 10 provides coordination of the processes and control of the input/output (I/O) functions for the system.

When using a synactor, as an interactive agent between a user and an applications program, for example, the interFACE system is configured as shown by the use block 40. User input to the applications controller 45 will call the desired synactor resource from a file in memory 39 via RAM 20. The script command controller 43 interprets scripts from the application controller 45 and, using the RAVE driver, provides the appropriate instructions to the display and the microprocessor 10. Similarly, as during the create (and test) process, the microprocessor 10 provides control and coordination of the processes and I/O functions for the interFACE system via a RAVER driver.

Figure 3:
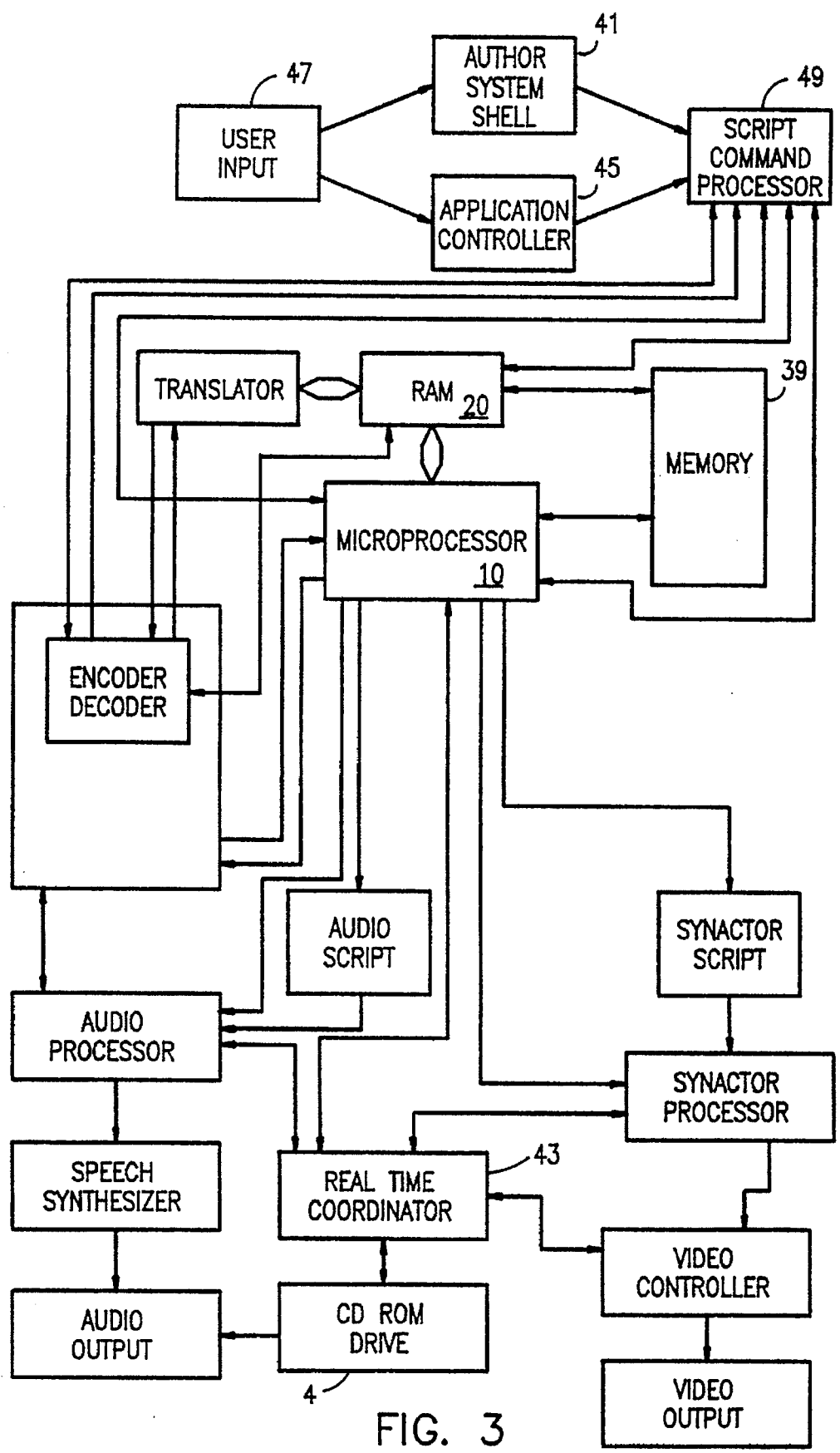
FIG. 3 is a functional block diagram illustrating the major data flows and processes for the system shown in FIG. 2.

Referring now to FIG. 3, a functional block diagram illustrating the major data flows, processes and events required to provide speech and the associated synchronized visual animation is shown. A detailed description of the processes and events that take place in the RAVE system is given in U.S. Pat. No. 4,884,972, and in U.S. patent applications Ser. No. 07/384,243 entitled "Authoring and Use Systems for Sound Synchronized Animation" filed on Jul. 21, 1989, now U.S. Pat. No. 5,111,409 issued May 5, 1992, and Ser. No. 07/497,937 entitled "Voice Animation System" filed on Mar. 23, 1990, now U.S. Pat. No. 5,278,943 issued Jan. 11, 1994, all of which are assigned to the instant assignee, and which are all incorporated by reference as if fully set forth herein and will not be repeated in full here.

The interFACE system comprises the author system shell 41, the application controller 45, the script command processor 49 and associated user input devices 47, which may include one or more input devices as shown in FIG. 1, and which is interfaced with the RAVE system at the script command processor 49. In response to a user input, the application controller 45 or the author system shell 41 calls on the microprocessor 10 to fetch from a file in memory 39 a synactor resource containing the audio and visual characteristics of a particular synactor. As required by user input, the microprocessor will initiate the RAVE sound and animation processes. Although both the author system shell 41 and the application controller 45 access the script command processor 49, the normal mode of operation would be for a user to utilize the author system shell 41 to create/edit a synactor and, at a subsequent time, utilize the application controller 45 to call up a synactor for use (that is, speech and visual display) either alone or coordinated with a particular application program.

The interFACE software system is a "front end" program that interfaces a host computer system as illustrated in FIG. 1 to the RAVE system to enable a user to create and edit synactors. The system comprises a number of modes each with an associated screen display, plus a navigation window or "palette" for selecting and changing system modes, a set of menus with commands (some of which vary with the mode currently selected), and additional screen displays (alternately referred to as "cards" or "windows") which are displayed in associated modes. The screen displays have activatable areas referred to as buttons that respond to user actions to initiate preprogrammed operations or to call up other windows, tools or subroutines. The buttons may be actuated by clicking a mouse on them or by other suitable methods, using a touch-screen for example. The screen displays also may include editable text areas, referred to as "fields". The interFACE system comprises a number of such displays which the user moves between by activating window items or "pressing" buttons (that is, by clicking on a button via a mouse) to create, edit and work with synactors. A preferred embodiment of the interFACE system in accordance with the principles of the present invention is described in the "Installation Guide" and in the "User's Guide" for "interFACE, the Interactive Facial Animation Construction Environment" which are also incorporated by reference as if fully set forth herein.

Referring now to FIGS. 4-9, various diagrams illustrating an overview of the interFACE system menus, windows, and screens are shown. Tables I and II list the various menus and windows utilized by the interFACE system.

TABLE I interFACE MENUS

| 1 | 100 | Apple |
|---|---|---|
| 2 | 101 | File |
| 3 | 110 | Edit |
| 4 | 102 | Go |
| 5 | 106 | Actors |
| 6 | 107 | Sounds |
| 7 | 104 | Dressing Room |
| 8 | 108 | Speech Sync |
| 9 | 114 | Stage |
| 10 | 122 | Clip Art |

TABLE II interFACE Windows and Tables

| 1 | 100 | Menu Screen |
|---|---|---|
| 2 | 173 | Untitled |
| 3 | 155 | Text |
| 4 | 156 | Phonetic |
| 5 | 182 | Go |
| 6 | 107 | Speech Sync |
| 7 | 168 | MacRecorder |
| 8 | 103 | ActorNav |
| 9 | 169 | Stage |
| 10 | 140 | dBox |
| 11 | 152 | Tool Palette |
| 12 | 104 | Line Palette |
| 13 | 102 | Pattern Palette |
| 14 | 145 | Color Palette |
| 15 | 144 | Brush Palette |
| 16 | 153 | Voice Palette |
| 17 | 183 | Express Palette |
| 18 | 163 | actorPref |
| 19 | 165 | Print |
| 20 | 178 | Scrap |
| 21 | 179 | Convert |
| 22 | 184 | Resize |
| 23 | 186 | wd2Print |
| 24 | 175 | Nav |
| 25 | 187 | layer |
| 26 | 189 | CDRecite |
| 27 | 190 | GUI sync |
| 28 | 191 | Dendrogram |

Figure 4:
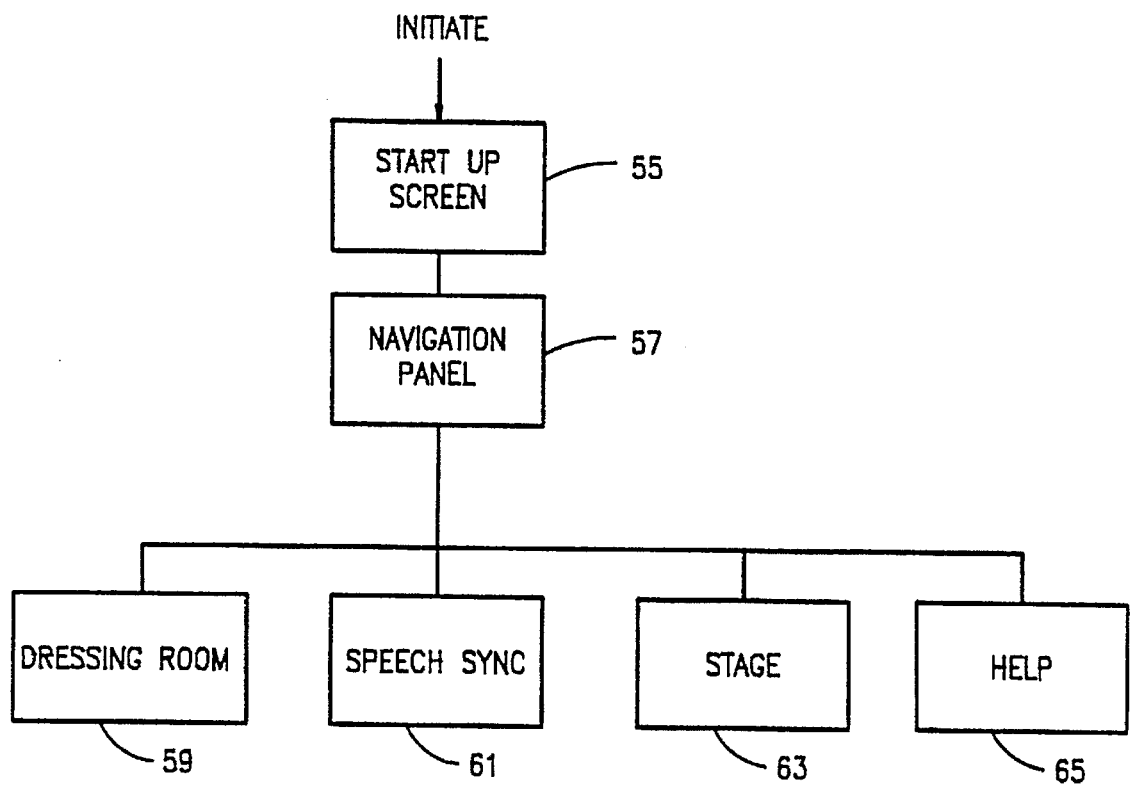
FIG. 4 is a functional block diagram illustrating a hierarchical overview of the InterFACE screens.
Figure 5:
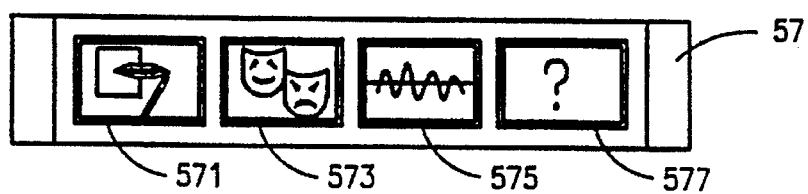
FIG. 5 is a diagram illustrating the navigation panel as displayed on a screen in the system shown in FIG. 4.

With particular reference to FIG. 4, a system block diagram illustrating the various operational modes of the interFACE system is shown. The interFACE system comprises four basic screens or modes: the Dressing Room 59, the Speech Sync Lab 61, the Stage 63 and the Help mode 65. Each mode is represented by a screen button on a navigation window 57. When a user initiates the interFACE system, a startup screen 55 is displayed by the host system. The startup screen (not shown) comprises one card and informs a user that he or she has initiated and is running the interFACE system. The startup screen also provides the user with bibliographic information and instructions to begin use of the interFACE system. After a short pause to load the program, the RAVE and RAVER drivers are loaded and called to perform predesignated system checks. The RAVE driver is a portion of the interFACE system that handles much of the programmatic functions and processes for synactor handling. The RAVER driver contains a number of programmatic functions related primarily to synactor editing. It is only used in the authoring system. The segregation of these functions reduces the memory requirements of the use system 40, which includes only the RAVE driver.

After the initial system checks have been completed, the interFACE system displays the navigation window or palette 57, unless other preferences were previously set up by the user. The navigation palette 57 displays four buttons 571, 573, 575, 577 for accessing the interFACE system modes. Access may also be accomplished from various modes within the system utilizing menu commands. Normally, the navigation palette 57 is positioned on the current screen display immediately below the menu bar 579 to conserve screen space and avoid blocking of other interFACE windows. The user, however, may position the navigation panel 57 anywhere on the screen display. The navigation palette 57 is provided with "handles" (not shown) to allow it to be repositioned on the display. To move the navigation palette 57 the cursor is moved to either handle with a mouse (or other means). With the mouse button depressed, the navigation palette is then moved (dragged) horizontally or vertically on the display to the desired position.

The four navigation buttons allow the user to go to the Dressing Room 59, go to the Stage 63, go to the Speech Sync Lab 61 or to go to the interFACE context sensitive Help mode 65. With the exception of the help button 577, the navigation buttons take the user to different screens within the interFACE system. The help button 577 initiates the context sensitive Help mode 65 which provides assistance when a user positions a "?" cursor over a desired item displayed on the screen currently in use.

Figure 6:
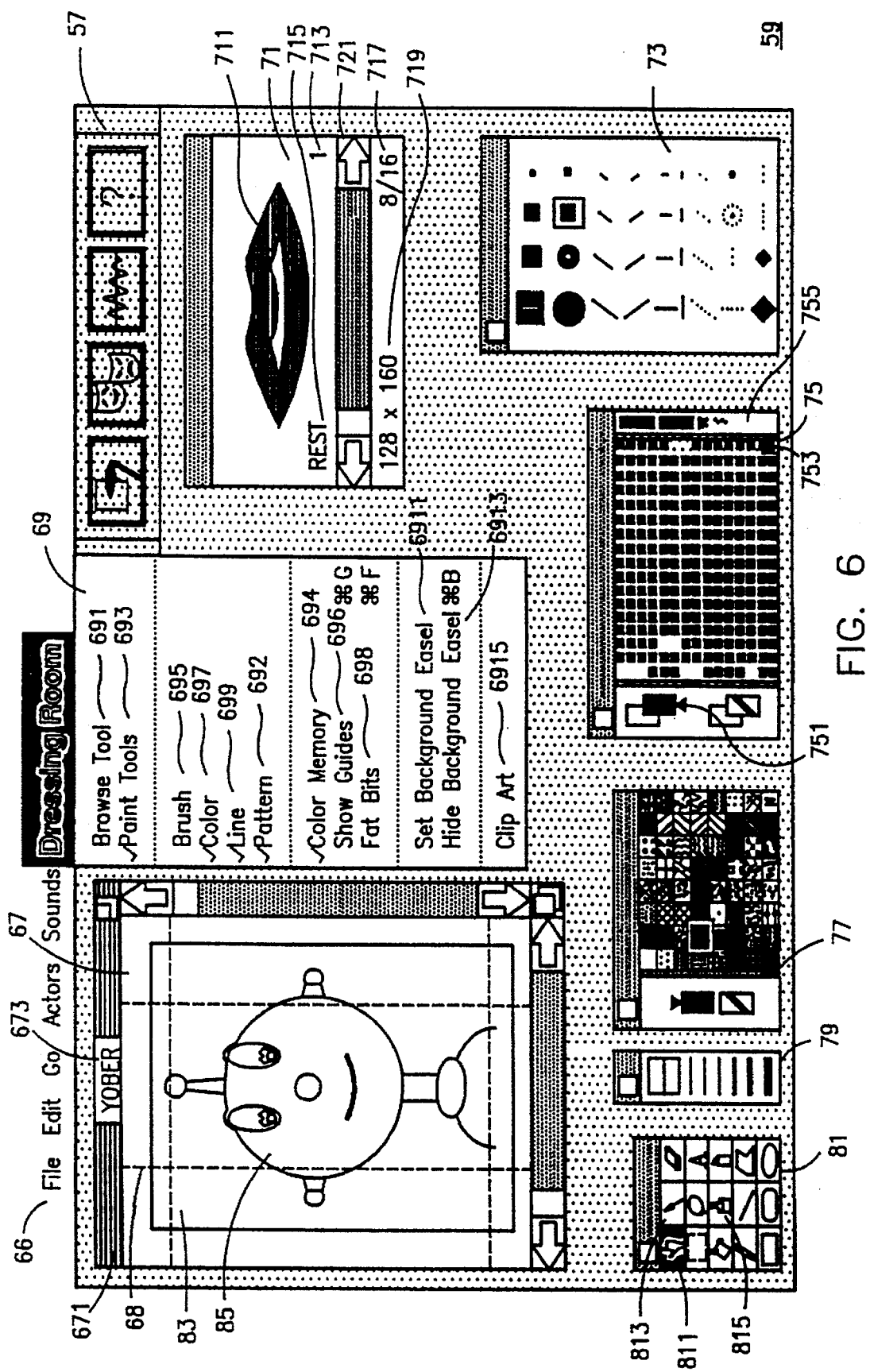
FIG. 6 is a presentation of the Dressing Room screen of the system shown in FIG. 4.

Referring now to FIG. 6, the Dressing Room 59 is used to create new synactors or to edit existing synactors. A user may go to the Dressing Room from any mode within the interFACE system.

Figure 9F:
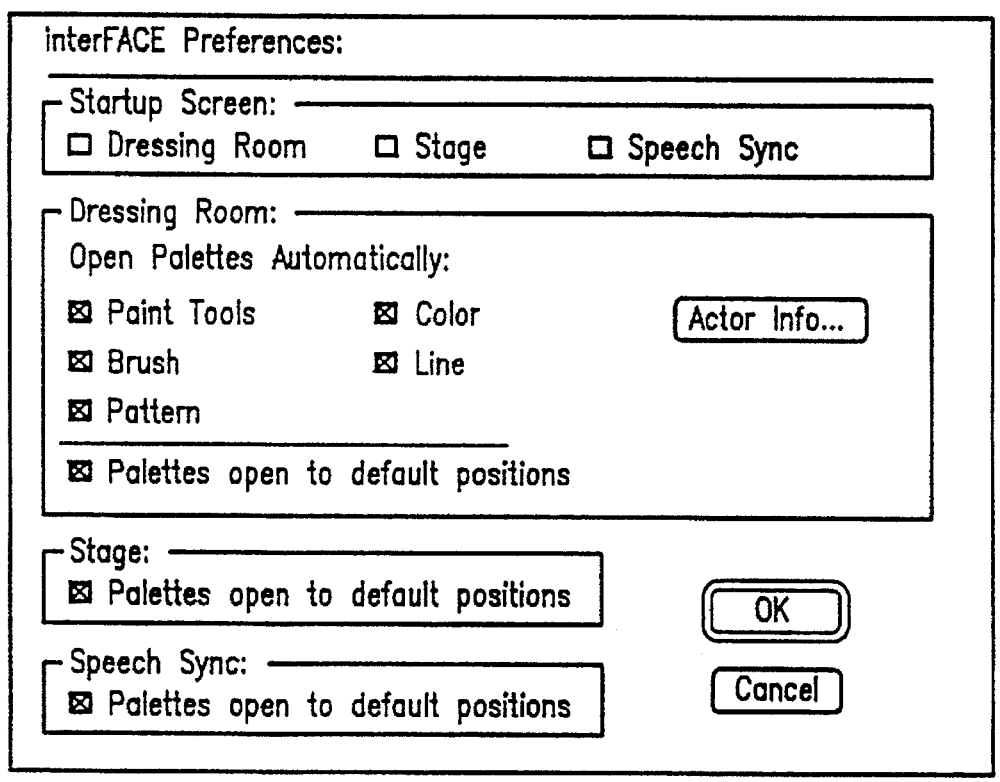

Generally, the Dressing Room can be selected by the navigation 57 when in any mode within the interFACE system. The dressing room may also be selected from the GO menu (as shown in FIG. 9d). The Dressing Room can also be selected as the opening startup section for interFACE by selecting dressing room on the interFACE Preferences window (as shown in FIG. 9f).

When the Dressing Room 59 as initiated, two windows 67, 71 automatically appear on the display. The dressing room window 67 which provides the working space for creation and editing of synactors. The control panel window 71 allows the user to navigate between the various images of the current synactor and displays information related to the image 711 currently displayed in the control panel window 71.

The title bar 671 at the top of the window 67 displays the name of the selected or current synactor 85. If a new synactor is being created/edited, the title 673 of the window will be "Untitled". The dressing room window 67 can be moved to any location on the screen 59. In addition, the size of the dressing room window 67 may be changed as desired. The synactor image 85 is displayed on the easel 83 in the dressing room window 67.

Figure 7A:
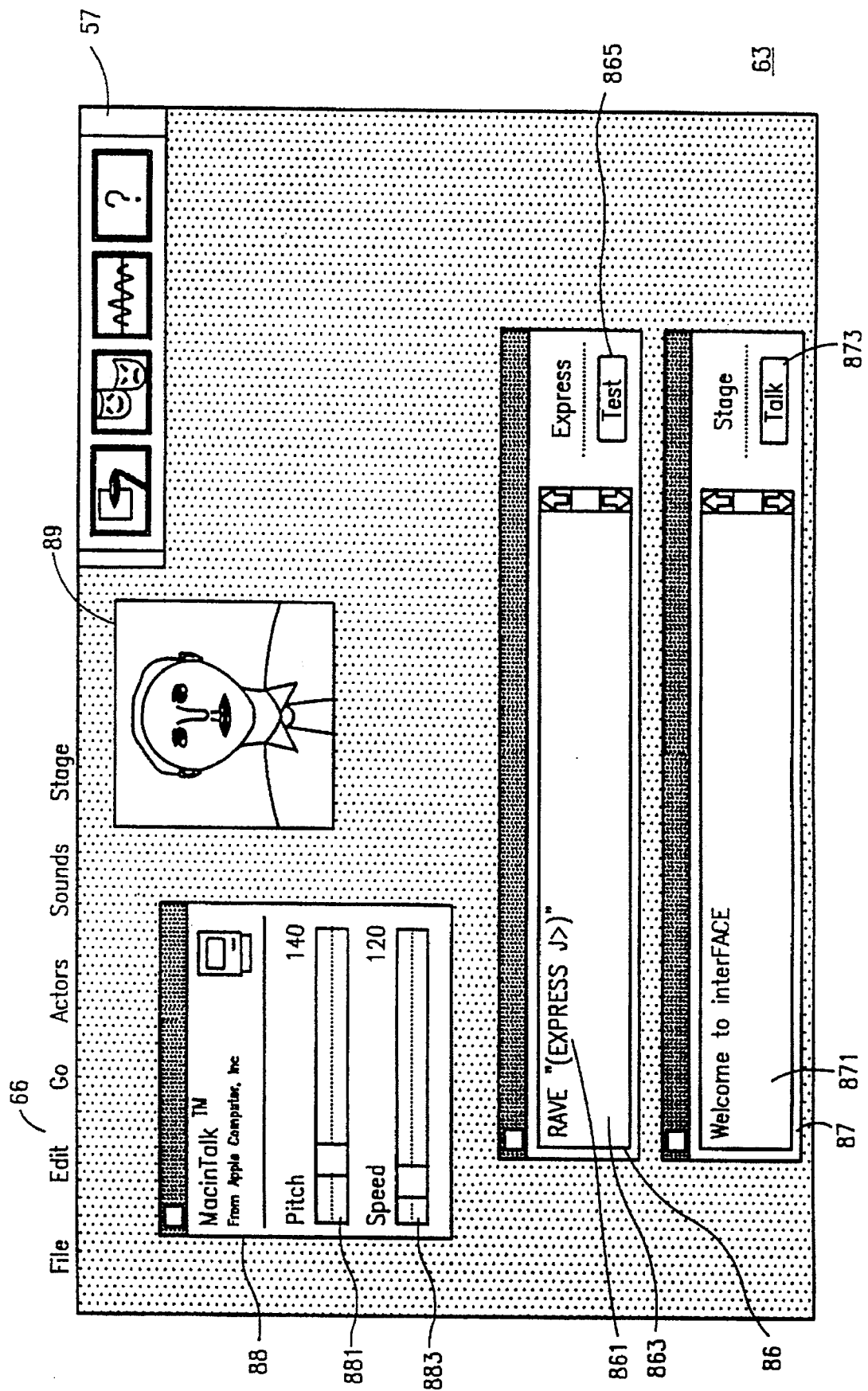
FIG. 7a is a presentation illustrating the stage of the screen system shown in FIG. 4.

Referring now to FIG. 7a, the Stage screen 63 provides a display for examining and testing the lip-synchronization of newly constructed synactors with a voice provided by a speech synthesizer. Similar to the Dressing Room screen 59, a user can get to the Stage screen 63 by three methods. Select the Stage as the startup screen; from the navigation palette 57; or use the stage command from the Go menu. Similarly, a user may go to the Stage screen 63 from any mode within the interFACE system.

The Stage screen can also be designated as the startup screen. When the Stage screen is the startup screen, a synactor must be selected before proceeding.

The Stage screen 63 enables a user to test a synactor's sound animation. Sample text is entered via the keyboard or other suitable means in text field 871 provided in the stage window 87. Depressing the Return key or Enter key on the keyboard, or using a mouse to click on the talk button in the stage window or selecting the Speak Text window command under the Stage Menu causes the synactor to speak using the speech synthesizer which was last selected with the sound window to provide synthesized audio from the sample text in the text field 871. Synthesized speech, as used in the stage screen, is automatically synchronized by the RAVE driver as described in more detail hereinbelow.

For digitized sounds, the process of ensuring that the synactor face image has the correct lip position at the time the sound is produced is referred to as speech synchronization. Digitized recordings of the user, famous people, or any other sound can be used with synactors.

Figure 8A:
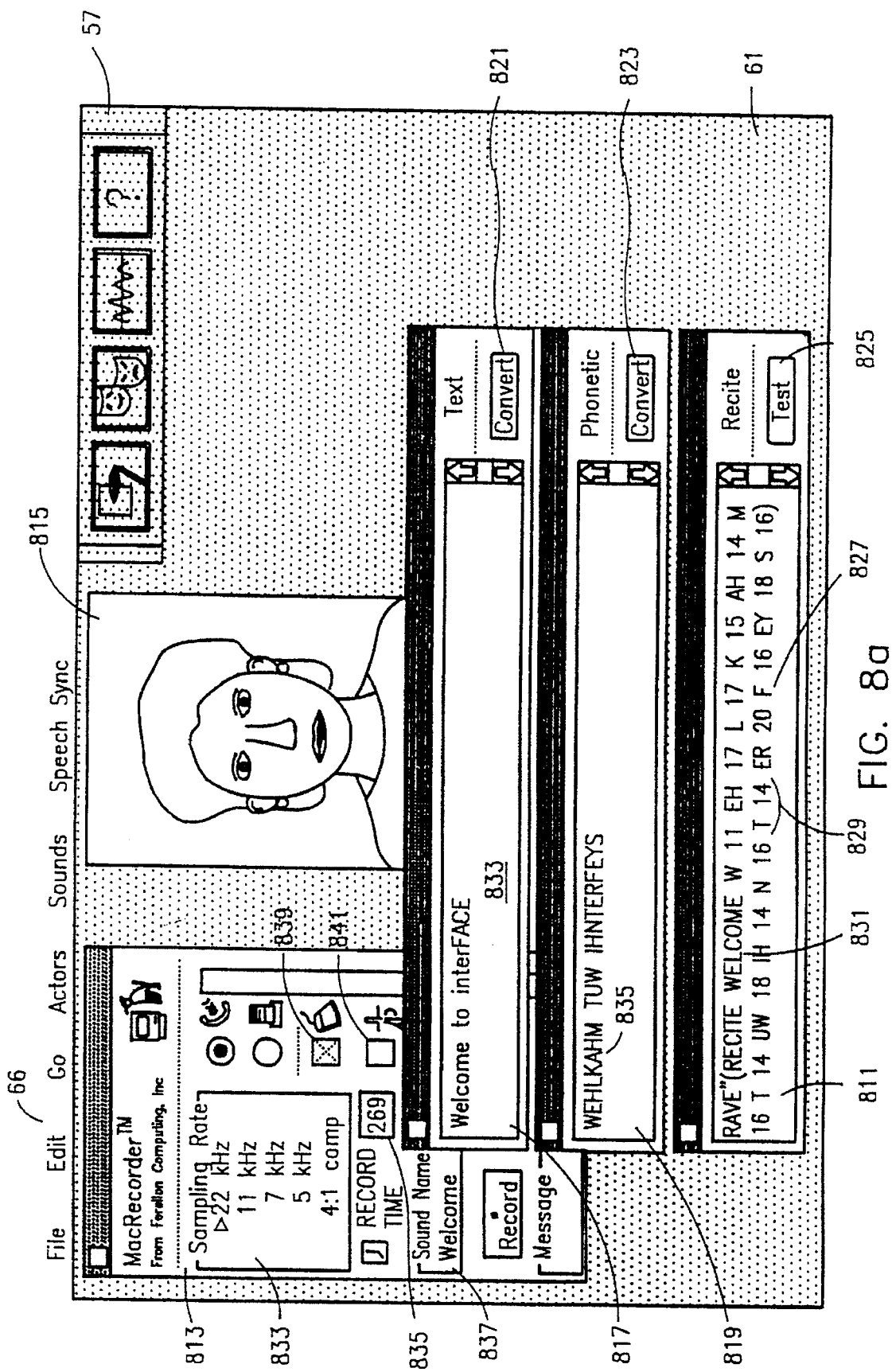
FIG. 8a is a presentation illustrating the Speech Sync Lab screen of the system shown in FIG. 4.

Referring now to FIG. 8a, the Speech Synchronization Lab (Speech Sync Lab) 61 is responsible for the creation of commands which automatically synchronize synactor animation and digitized sounds. The Speech Sync Lab 61 provides automatic approximations of the animation required for a particular sound utterance. The animation generated by this approximation will not always be perfect, but serves as a starting point for editing or fine tuning the synchronization. Various tools then are used to aid in fine tuning the speech synchronization process. The Speech Sync Lab 61 basic synchronization methodology (referred to as "phonetic proportionality") and additional enhanced speech synchronization tools will be described in greater detail hereinbelow.

InterFACE's online Help mode 65 provides useful information related to the various functions and features of the interFACE system. The interFACE Help mode can be accessed in two ways: (1) selecting the HELP command from the file menu (as shown in FIG. 9a) or (2) selecting "Context Sensitive Help" by use of the "?" button 577 on the navigation palette 57.

Figure 9I:
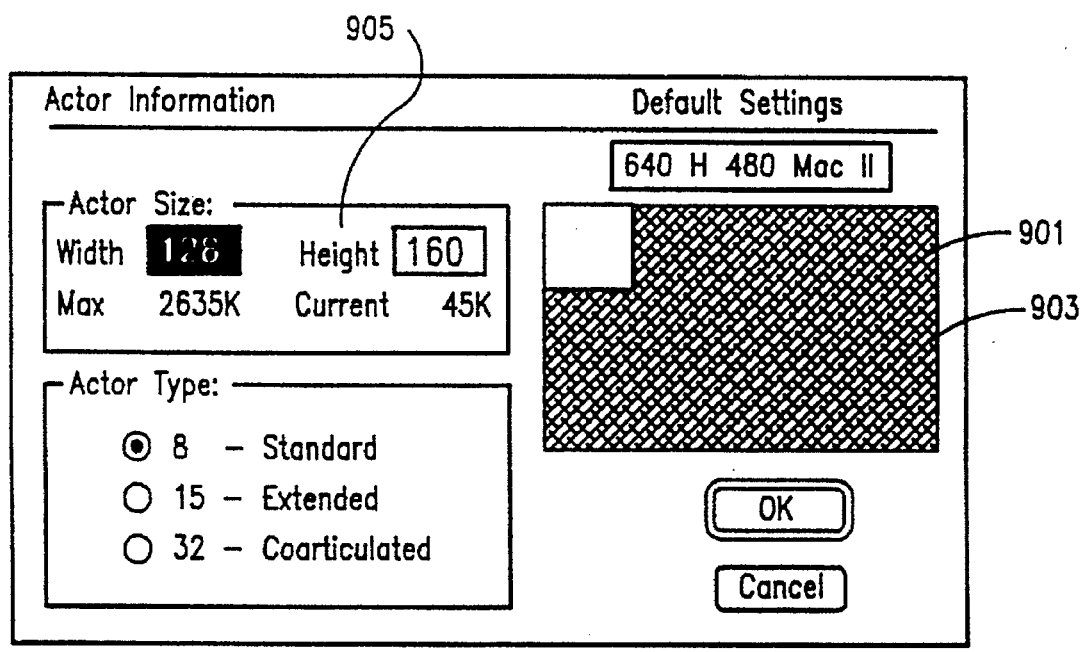
Figure 9J:
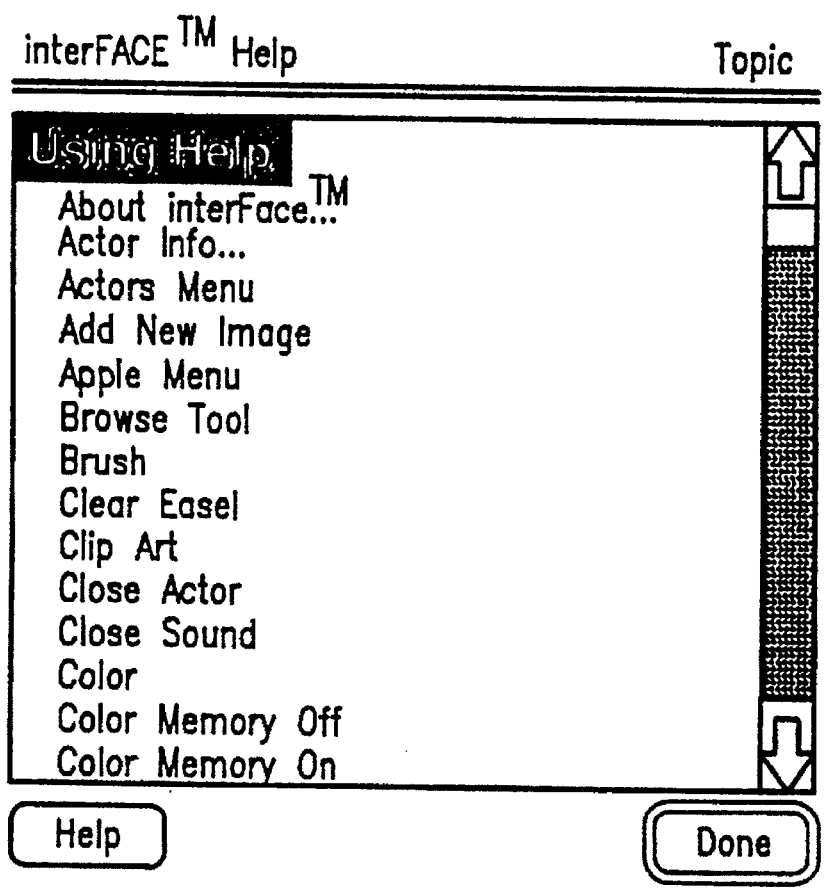

Selection of help on the file menu (shown in FIG. 9a) provides the help dialogue window shown in FIG. 9j. When a topic is selected from the dialogue window, the help system 65 retrieves and displays the selected information.

Context sensitive help is an advanced extension of the interFACE Help mode that allows a user to quickly and intuitively find information help related to a window or menu command or other feature. When the context sensitive help mode is entered, the cursor changes into a "?" and the navigation palette context sensitive help button 577 becomes highlighted. The contact sensitive help mode is used by positioning the "?" cursor over or near the screen or window item that related information is desired. To exit the Help mode, press command-? again or click on the navigation panel's context sensitive help button 577. The cursor will return to its previous setting and the context sensitive help button 577 will no longer be highlighted.

Various elements of the interFACE system can be altered from their default setting using the preferences window (shown in FIG. 9f). The preferences window is opened by choosing the preferences command from the file menu. The preferences window can be used to choose a startup screen, ie, the screen which appears immediately after the initial interFACE screen, designate which windows are automatically opened and where the windows open up. The Preferences window is described in greater detail herein below.

With continuing reference to FIGS. 4 and 9a-9k, each of the three basic modes 59, 61 and 63 has its own unique menus and windows. A number of pull down command menus common to all of the basic modes provide operational control of the interFACE system. The menus common to all modes are the File Menu, Edit Menu, Go Menu, Synactor Menu and Sounds Menu shown in FIGS. 9a-9e. The common menus are selected from the command menu displayed on the command menu line 66 at the top of the display as shown in FIGS. 6a, 7a and 8a. While the common menus may be accessed from any of the interFACE modes, some of the menu commands provided by a given menu may only be available in certain, applicable interFACE modes.

File Menu

Referring now to FIG. 9a, the menu commands under the File Menu allow the user to view and modify the preference settings, access online help, import and export scrapbook files, print images, and exit (quit) from the interFACE system.

The preferences command displays the Preferences window (FIG. 9f), which provides system settings for the interFACE system. The preferences window allows a user to view and modify the system settings.

The Dressing Room screen 59 always opens to create a new synactor as specified by preferences or settings (that is, settings made to the parameters specified in the preferences window). To view or modify these default values, click on the file menu Synactor Info button. The Synactor Information window, FIG. 9i, will be displayed showing the synactor size default width and height, and the synactor type. The default width and height can be modified by typing a new value in the width and height fields.

The screen representation 901 displayed on the right-hand side of the synactor information window illustrates the approximate size of the synactor as indicated in the width and height fields. The screen representation is initially set as a function of the host system display dimensions.

The default width and height can also be altered by simply clicking and dragging the handle 903 on the synactor representation. As the size of the synactor is changed, the width and height fields 905 update automatically.

The help menu command opens the Help mode window (shown in FIG. 9j), which contains a list of all available topics. Double-click on any topic to retrieve a brief description of the selected topic.

When the context sensitive help menu command is selected, the cursor changes to the context sensitive help cursor as described above. The context sensitive help button 577 on the navigation panel 57 will also become highlighted.

When in the context sensitive help mode a menu command or window button can be selected or clicked on to open the Help mode window related to that command or window. The Help mode window will appear, automatically opened to that item's help information.

The Import from Scrapbook command opens a window prompting a user to select a scrapbook file for importing into the current synactor. The scrapbook file selected must be one that contains framed synactors created using the Export to Scrapbook command. This option is only available while in the Dressing Room 59.

The Export to Scrapbook command displays the Export Images window (shown in FIG. 9g) allowing a user to place several or all of the current synactor images into a scrapbook file. The scrapbook file may then be used to easily move synactor images to other applications. When the export images window is displayed, first and last image numbers 907, 909 are placed in the From and To Fields, respectively.

The values are selected to include only the images that are desired to be exported. A user can also select whether or not each synactor image is to be surrounded by a black border referred to as the frame. Frames are necessary to be able to automatically import images back into an synactor. The export to scrapbook command is only available while in the Dressing Room 59.

The Print Images command displays the Print Image window (as shown in FIG. 9h). When the window is displayed, the current synactor image number is placed in the From and To Fields 911, 913, respectively. The values are adjusted to include only the synactor images desired to be printed. A synactor image can be referenced either by its label or its number. A user can also specify whether or not a frame is to be printed around each synactor image. With the print and easel option selected, the easel will be placed around each synactor image in the printout (not shown). With the print and easel option deselected, only the synactor image will be printed. The print images dialogue command is only available while in the Dressing Room 59.

The File menu quit command closes the interFACE application and exits to the host system.

Edit Menu

Referring now to FIG. 9b, the Edit Menu provides commands for adding, deleting, converting, resizing, and cropping images of the current synactor 85 while in the Dressing Room 59.

The Cut command allows a user to remove selected graphic or text information. The removed information is be placed in the Clipboard.

The Copy command allows a user to duplicate selected graphic or text information. The copied information is placed in the Clipboard.

The Paste command allows a user to place the current graphic or text information from the Clipboard into a graphic or text field.

The Clear Easel command erases the artwork currently on the easel 83 in the Dressing Room 59. This menu command is active only while in the Dressing Room.

The Paste to Easel command transfers or copies the current graphic information from the Clipboard into the easel 83. This menu command is active only while in the Dressing Room.

The Revert Image command restores the most recent image for the current image 85 being edited in the Dressing Room easel 83. The restored image will replace the current image in the easel 83. This menu command is active only while in the Dressing Room 59.

The Add New Image command creates a new image and places it as the last image for the current synactor. After a new synactor image is added, the easel 13 deletes the current image and is set to display the added image. The control window 71 is also updated accordingly.

A user can continue adding images to a synactor (that is, to the synactor file) until a predetermined maximum has been reached. In the preferred embodiment, the maximum limit is set at 120. In general, the number of allowable images is limited only by available memory. For a particular implementation, if the memory limit or the maximum limit is reached, the add new image menu command is disabled until synactor images are removed or additional memory is made available. The add new image feature is available only while in the Dressing Room 59.

The Delete Last Image command removes the last image from the current synactor. Synactor images can be deleted until a predetermined minimum number of images remain. In the preferred embodiment, the minimum number of images for Standard or Extended synactors is 16 and for Coarticulated synactors is 32. When the minimum number of images remain, the delete last image menu command is disabled until a new image is added. This menu command is available only while in the Dressing Room 59.

The Copy Rest to All command will copy the rest image of the current synactor to all of the current synactor's images. This command is available only in the Dressing Room 59.

The Synactor Info command displays a window (as shown in FIG. 9i) used to change the current synactor setup of the Dressing Room 59. The synactor info window is similar to the Synactor Info menu command on the interFACE Preferences window (FIG. 9f), except that the displayed synactor information pertains to the current new synactor in the Dressing Room.

Only new synactors created when the Dressing Room is initially opened or created by closing the current synactor can be modified utilizing the synactor info window. The attributes of a synactor having more than one image cannot be modified using the synactor info command. Once the first image is added to a synactor (by displaying a synactor image other than the rest image), the synactor info window command becomes disabled. The menu command is active only while in the Dressing Room 59. The synactor info window is also used in conjunction with the Preferences window (FIG. 9f) to set the attributes of the opening synactor.

The Convert Synactor command opens a window which allows a user to convert the current synactor to a different type of synactor. For example, a Standard synactor can be changed to an Extended synactor using this command. This menu command is active only while in the Dressing Room 59.

The Resize Synactor command opens a window which allows a user to change the size of the current synactor. Resizing a synactor will stretch or shrink all of the associated synactor images to the new specifications. This menu command is active only while in the Dressing Room 59.

The Crop to Guides command allows a user to change the size of the current synactor. The crop to guides command differs from the resize synactor command in that it allows a user to add or subtract area from the current synactor. All existing images of the synactor will be automatically cropped to fit the new size.

To crop a current synactor 85, first select the Show Guides menu command from the Dressing Room menu 69. Utilizing the margin controls of the dressing room window 67, position the guides 68 to new locations indicating the desired size and select the crop to guides command. As the interFACE system crops the current synactor, it will cycle through each image to display what portion of each image is being cropped. This menu command is only active while in the Dressing Room and while the guides 68 are visible.

Go Menu

Referring to FIG. 9c, the Go menu provides commands which allow the user to navigate among the interFACE basic modes, the Dressing Room 59, the Stage 63 and the Speech Synch Lab 61. The navigation window 57 may also be displayed or hidden from a Go menu command.

Synactor Window

Referring now to FIG. 9d, the Synactor window provides various commands for opening, closing, saving, and manipulating synactors in files. Special commands for navigating are also provided. The synactors menu is always available.

The Open Synactor menu command displays a window (not shown) for selecting a synactor to be opened. In the Dressing Room 59, the selected synactor rest image will be displayed and the Dressing Room 59 will be set up accordingly. In the Speech Sync Lab 63 or the Stage 61, the selected synactor will be displayed.

The Close Synactor command removes, deletes, the current synactor. Closing the current synactor while in the Dressing Room 59 will reset the Dressing Room for a new synactor. The close synactor menu command is not active while in the Stage 63 or the Sync Lab 61 because a synactor must always be displayed while in these modes. The Save Synactor command saves the current synactor to its file.

The Save Synactor As command displays a window for storing the current synactor. In order to save a synactor, the name for the synactor that it is desired to save must be entered. The save synactor as command may also be used to save the current synactor under a new or different name.

The Prev Image menu command displays the image immediately before the synactor's current image. The previous image is copied to the easel and the control window 71 is properly updated. The prey image command is available only while in the Dressing Room.

The Next Image menu command displays the image immediately after the synactor's current image. The next image is copied to the easel 83 and the control window 71 is properly updated. The next image command is available only while in the Dressing Room 59.

The Go to Image command brings up the go to image window (not shown) which is used to immediately see a synactor's image. The control window 71 is automatically updated. This menu command is available only when in the Dressing Room 59.

The Copy Synactor command displays a window (not shown) which enables a user to copy a synactor from a source file to a destination file. The copy synactor command is always available.

The Delete Synactor command displays a window (not shown) which enables a user to remove a synactor from a file. The delete synactor command is always available.

Sounds Menu

Referring now to FIG. 9e, The Sounds Menu provides commands for manipulating sounds within the interFACE basic modes. Sounds can also be copied and deleted from files. The sounds menu is always available.

The Open Sound menu command allows a user to select a sound to work with while in the Speech Sync Lab 61 (FIG. 8a). If there is a RECITE command currently in the recite window 811, the name of the selected sound will automatically be placed into that RECITE command. The open sound command is available only in the Speech Sync Lab 61.

The Close Sound command removes the current sound from memory. If a RECITE command is currently in the recite window 811, the name of the sound will automatically be replaced with "??????" in the RECITE command. This indicates that there is no sound available to use with the RECITE command. In order to continue, a new sound will have to be opened. When a sound is opened, the command changes to Close Sound: soundNAME where "soundNAME" is the name of the open sound. This indicates which sound is currently open. This menu command is available only in the Speech Sync Lab 61 and only if a sound has already been opened.

The Play Sound command will play the current sound file without any synchronized animation. This menu command is available only in the Speech Sync Lab 61 and only if a sound has been opened.

The Record Sound displays an audio digitizer window 813 for recording sounds with the audio digitizer. The appearance of the window and the controls available to a user of the window will vary as a function of which audio digitizer is being used. The audio digitizer window 813 allows a user to control the recording process of sound. It includes simple commands and options for recording sound. After recording a sound, the recorded sound may immediately be used within the interFACE basic modes. The Record Sound command is available only in the Speech Sync Lab 61.

The Copy Sound command allows a user to copy a sound from a source file to a destination file.

The Delete Sound command allows a user to remove a sound from a file.

Dressing Room

Referring now particularly to FIG. 6, when the Dressing Room mode is entered or opened, the Dressing Room screen 59 is displayed along with the dressing room window 67 and dressing room control window 71. The Dressing Room menu 69 is a pull down menu which provides various commands for controlling Dressing Room features and access to various windows and tools for working with a synactor. The Dressing Room menu 69 is available only when in the Dressing Room 59 and is always displayed on the Dressing Room screen as shown.

The Browse Tool command 691 changes the cursor to the browse tool icon 811. If the paint tools palette 81 is displayed, the icon 811 will be highlighted to indicate that the browse tool is currently selected. The browse tool allows a user to manipulate the Dressing Room easel 67 and guides 68.

The Paint Tools command 693 displays the Paint Tools Palette 81. If the paint tools palette 81 is already displayed, the paint tools command 693 will close it. The paint tools palette 81 provides interFACE various paint tools for working with synactors. A check mark adjacent the paint tools menu command 693 indicates that the paint tools palette 81 is currently open and displayed.

The Brush menu command 695 displays the Brush Palette 73. If the brush palette 73 is already visible, it will be closed. The brush palette 73 is used to select a brush shape for use with the Brush Tool 815. A check mark by the brush menu command indicates that the brush palette is currently open.

The Color menu command 697 displays the Color Palette 75. If the color palette is already visible, it will be closed. The color palette 75 is used to select any of the available 256 colors to be used with the paint tools. The color menu command 697 and color palette 75 are only available when in 256 color mode. A check mark by the color menu command indicates that the color palette is currently open.

The Line menu command 699 displays the Line Palette 79. If the line palette is already visible, it will be closed. The line palette 79 is used to select a line thickness for use with various paint tools. A check mark by the line menu command indicates that the line palette is currently open.

The Pattern command 692 displays the Pattern Palette 77. If the pattern palette 77 is already visible, it will be closed. The pattern palette is used to select a pattern for use with various paint tools. A check mark by the pattern menu command indicates that the pattern palette is currently open.

The Show Guides command 696 displays the horizontal and vertical pair of guides 68 in the Dressing Room window 67. The guides 68 are used as reference points for viewing differences/similarities between synactor images. The guides 68 are also used for cropping the images of a synactor.

A guide 68 may be repositioned by clicking and dragging on it with the browse tool 811. Once a user clicks on a guide 68, the cursor changes to indicate that a guide 68 is being moved. Guides are positioned over the easel 83. The guides 68 remain at the last assigned location as a user navigates among the current synactor images.

The show guides menu command 696 will change to Hide Guides if the guides 68 are visible. The hide guides menu command removes the horizontal and vertical pair of guides 68 from the Dressing Room window 67. As shown in FIG. 6, the guides 68 are illustrative only and, in the preferred embodiment, are not displayed when the show guides menu command 696 is displayed.

The Fat Bits command 698 provides a window (not shown) which displays a magnified view of a portion of the synactors image 85 currently displayed on the easel 83, which the user can then modify a pixel at a time.

The Set Background Easel command 6911 places the current synactor image 85 into the background easel (not shown). The Background Easel is displayed immediately behind the easel 83 and is used for comparing and contrasting synactor images. Any synactor image can be placed in the background easel. The synactor image displayed in the background easel allows a user to see and adjust changes and contrasts with the synactor image displayed in the easel 83. A striped bar (not shown) appears at the top of the Dressing Room window 67 indicating the presence of the background easel.

When this command 6911 is selected, the background easel is automatically displayed and the Hide Background Easel menu command 6913 is enabled. The hide background easel command 6913 removes the background easel from the dressing room window 67. This menu command 6913 is not available until the background easel has been set with the set background easel command 6911.

The Clip Art command 6915 displays the Clip Art menu (not shown) on the Dressing Room screen. The Clip Art menu is a pull down menu which is displayed adjacent the dressing room menu 69. The Clip Art window allows a user to choose and navigate among the various clip art windows provided in the interFACE Clip Art library. For example, the Clip Art menu default command is the "mouths" window (not shown) which provides a user with a selection of different mouth forms and configurations to use with a synactor. The Clip Art menu is available only in the Dressing Room 59.

The Dressing Room Window 67 displays the Easel 83 in which art copied from a Clip Art window, for example, is placed and edited to create a synactor 85. The size and position on the screen of the dressing room window 67 may be altered at any time.

The easel 83 is a drawing window or container located within the dressing room window 67. Paint tools are utilized to create artwork that is, to create or edit a synactor 85, within the easel. Imported art may also be placed within the easel. The border of the easel 83 is outlined and shadowed to indicate its dimensions and location within the dressing room window 67. The easel may be moved about within the dressing room window. Clicking on the easel with the browse tool 811 causes the cursor to change its shape thus indicating that the easel may be moved.

The size of the easel 83 can be changed with the browse tool by clicking within the lower fight-hand corner of the easel. When the cursor is within the lower fight-hand corner of the easel, clicking with the mouse changes the cursor shape to indicate that easel size may be modified. The size of the easel can only be changed when working on a new synactor.

The dressing room window 67 also includes two pairs of horizontal and vertical guides 68 which are used for image positioning and for cropping a synactor image. The guides 68 are controlled as described herein above by the Show/Hide Guide menu commands 696 under the dressing room menu 69. Once visible, the guides 68 can be moved by clicking and dragging on them with the Browse tool. When the cursor is positioned over a guide, clicking with the mouse changes the cursor shape indicating that guide 68 can be repositioned.

The Dressing Room Control Window 71 allows a user to navigate among the images of the current synactor. Information concerning the current synactor (the synactor displayed on the easel 83) is displayed within the control window 71. The characteristics of a new synactor can also be changed from the control window. The control window 71 displays five fields which provide image and synactor information. The Image Label Field 715 displays the label for the current image; for example, the displayed lip position 711 is the "REST" lip position (which is also the default lip position). The Image Number Field 713 displays the number of the current image; the Width/Height Field 719 indicates the width and height of the current synactor; the Speaking/Total Image Number Field 719 indicates the number of speaking images and total number of images that are in the current synactor; and the Key Image Field 711 displays the associated lip position for each speaking image. For expression images, the title "Expression Image" appears in the key image field 711.

The Control Window Image Scroll Bar 721 provides four ways to view the images of the current synactor. The left and fight directional arrows allow a user to view the previous and next image. Clicking and holding the mouse down on either directional arrow will enable a user to cycle through the images in either direction. The image scroll bar 721 also has a thumb box which can be dragged either left or fight. Clicking on the gray area adjacent the thumb box advances the image proportionately.

If the current synactor is new and has not yet been modified, clicking on the lower portion of the control window 71 calls up the synactor information window (FIG. 9j) in a manner similar to selecting the Synactor Info menu command from the Edit Menu (FIG. 9b).

The Paint Tools Window or Palette 81 provides various tools for editing artwork within the dressing room window 67. The paint tools palette can be closed or moved to any location on the Dressing Room screen. To select a paint tool, position the cursor over the desired tool with the mouse and click on its icon. The icon will become highlighted indicating that it is the current tool. The cursor will also be displayed as the icon of the current tool when positioned over the dressing room window 67. The Browse tool 811 allows a user to manipulate the easel 83 and guides 68, as described above. The Pointer tool 813 is used to select and move graphics within the Dressing Room 59. The Brush Window or Palette 73 enables a user to change the shape of the brush used with the Brush tool 815. The brush palette 73 can be closed or moved to any location on the Dressing Room screen.

The Color Window or Palette 75 displays the 256 colors available when in color mode (as selected from the dressing room menu 69). The fill and pen colors can be selected from the color palette. A color is selected by positioning the color cursor 753 over the desired color and clicking with the mouse. An arrow marker 751 indicates whether a selected color is a fill or pen color. To change the color type, click on the desired color type graphic. As colors are selected, the type graphics change to the selected color. The color palette 75 also provides four special Color Memory buttons 75 which save color selections. When a color is selected, the top color memory button changes to the new selection. The next color memory buttons, in order, assume the color which the previous color memory button was set to. Selecting the Color Memory Command 694 from the dressing room menu 69 will disable the color memory buttons' ability to save new colors. In this manner, frequently used color can be easily accessed.

The Pattern Window or Palette 77 displays 64 patterns for use with the dressing room paint tools. Fill and pen patterns can be selected with the pattern palette.

The Stage

Figure 7B:
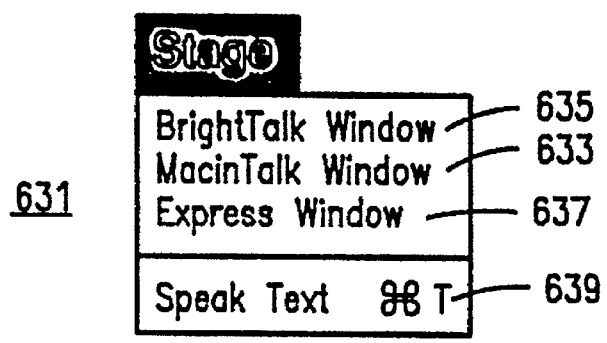
FIG. 7b is an illustration of the Stage Menu.

Referring now to FIGS. 7a and 7b, the interFACE Stage mode 63 provides windows for testing synactor animation and speech synchronization using a voice provided by a speech synthesizer. A speech synthesizer window is also provided for adjusting the settings for the available speech synthesizer. The navigation palette 57 is also displayed on the Stage screen to provide access to the other interFACE screens from the stage.

As described hereinabove, the Stage mode can be initiated from any screen in the system or as the startup screen when the interFACE program is initiated. If the Stage screen 63 is initiated from startup, an Open Synactor Window (not shown) will be displayed immediately after the interFACE startup screen to allow a user to select or open a synactor for the stage. If the Stage screen is selected from the Speech Sync Screen 61, the synactor currently selected will also be used in the stage screen 63. If the Stage is selected from the Dressing Room 59, the synactor currently being edited will be used in the stage screen 63. Even if the Dressing Room synactor 85 is only partially created, the Stage screen can be selected and that synactor will be transferred. This feature allows a user to test animation with speech as images are created. The transferred or selected synactor is displayed on the stage screen 63 in the synactor window 89.

The Stage Menu 63 (FIG. 7b) is a pull down menu which is displayed on the stage screen and allows a user to select a Speech Synthesizer to provide a voice and to initiate the Express Window 86 and Text Window 87. The Stage Menu is available only while in the Stage 63.

The Speech Synthesizer Window 88 is displayed on the Stage screen 63 when a specific speech synthesizer is selected from the stage menu 631. The speech synthesizer window 88 provides various controls adapted to the selected speech synthesizer which enable a user to change the pitch and speed rates and other selected characteristics of the speech synthesizer.

The MacinTalk Window menu command 633 displays the MacinTalk speech synthesizer control panel in the speech synthesizer window 88. The MacinTalk control panel provides a pitch slide bar 881 and a speed slide bar 883 to change the pitch and speed, respectively, of the MacinTalk voice.

The BrightTalk Window menu command 635 displays the BrightTalk speech synthesizer control panel (not shown) in the speech synthesizer window 88. The BrightTalk control panel is utilized to control the speech characteristics of the BrightTalk voice.

The Speak Text menu command 639 initiates and displays the Stage Window 87 on the Stage screen 63. The stage window 87 allows a user to test a synactor's speech animation by making the current synactor 89 pronounce the text string entered in the Text Field 871 of the stage window 87. To test the current synactor 89 speech animation, the test text string for the synactor is entered in the stage window Text Field 87 via the keyboard. Then pressing or clicking on the talk button 873 causes the synactor 89 to pronounce the test text string in the stage window text field 871. The text will be either pronounced utilizing the MacinTalk or BrightTalk speech synthesizer depending on which was last selected from the stage menu 631.

The speech animation test mode initiated by clicking on the talk button 873 causes the RAVER and RAVE drives to automatically segment the test text string and generate the appropriate RECITE command to display the synactor animation synchronized with the speech. The test text is segmented in accordance with the speech segmentation scheme utilized by the selected speech synthesizer. Differences between the selected speech synthesizer segmentation scheme and the RAVEL-defined segmentation scheme are automatically reconciled utilizing a voice reconciliation phoneme table, described in greater detail hereinbelow.

The Express Window menu command 637 initiates and displays the Express Window 86 on the Stage screen 63. The stage window 86 is used to test the animation, without speech, of the displayed synactor 89. An EXPRESS command 861 is utilized to build a sequence of synactor images to produce animation. EXPRESS commands 861 can be constructed via the keyboard within the Express Field 863. An EXPRESS command comprises a sequential list or string of specified images, each image followed by the time that the image should be displayed. Timing values are entered in 60ths of a second. Pressing or clicking on the Test button 865 executes an EXPRESS command entered in the Express Field 863. When executed, the EXPRESS command causes the RAVE driver to execute and display the indicated animation with the current synactor 89. Once an EXPRESS command 861 has been executed, the last synactor image in the string 861 will be displayed in the synactor window 89.

The Speech Sync Lab

Figure 8B:
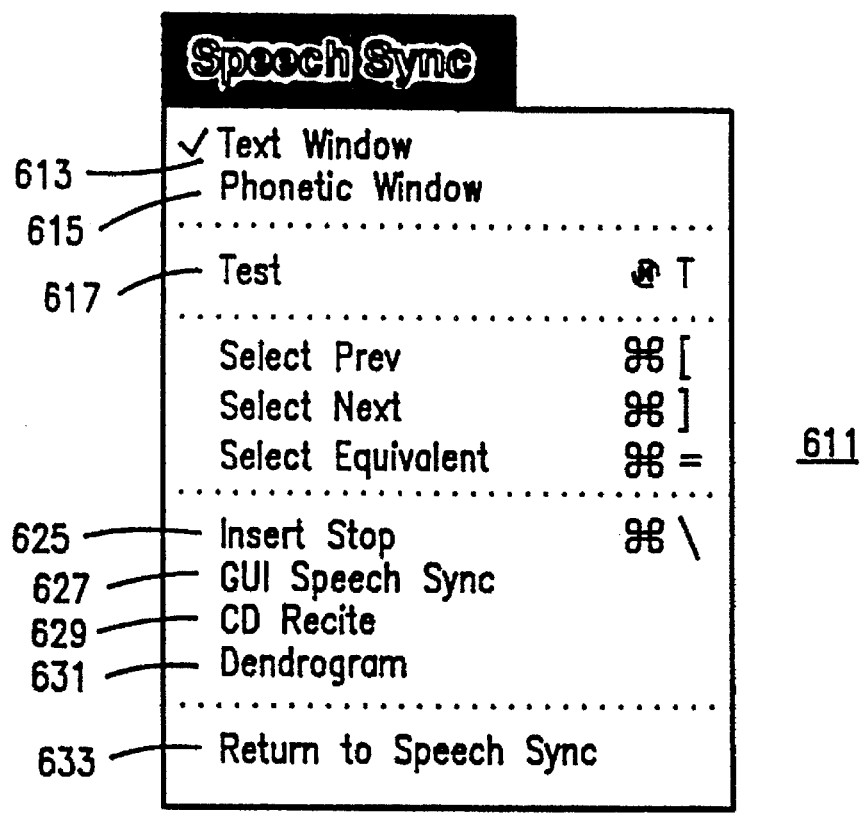
FIG. 8b is an illustration of the Speech Sync Lab menu.

Referring now to FIGS. 8a and 8b, the interFACE Speech Sync lab 61 provides a variety of tools and methods for synchronizing animation with digitized sound or audio previously recorded on compact disc. As described hereinabove, the Speech Sync Lab can be initiated from any screen in the interFACE system or as the startup screen when the system is initiated. Similar to the Stage mode, a synactor must always be assigned when in the Speech Sync Lab. If the Speech Sync Lab 61 is initiated from startup, the Open Synactor Window is displayed initially to. If the Speech Sync Lab 61 is entered from one of the other modes, then the current synactor for the other mode becomes the current synactor for the Speech Sync Lab 61.

Initiation of the Speech Sync Lab displays the Speech Sync Lab screen 61 as shown in FIG. 8a. The Speech Sync Lab screen 61 automatically displays the current synactor 815 when the Speech Sync Lab is entered. When the Speech Sync Lab is opened, the synactor 815 is displayed at top-center of the screen, but may be repositioned to any desired location with a mouse. The Text Window 817 and Recite Window 811 also open automatically when the Speech Sync Lab is entered. As in the other interFACE modes, the navigation palette 57 is also displayed.

The primary purpose of the Speech Sync Lab 61 is to provide a capability for the user to create and edit, "fine tune", a RECITE command. The RECITE command 827 comprises the command or instruction to the RAVE driver to produce sound synchronized animation with a currently selected synactor and sound. The RECITE command includes the sound name 831 followed by a sequence of phonetic/time pairs 829. The phonetic/time pair comprises a phoneme label or name followed by a time value (in ⅙₀'s of a second) which is the amount of time that a facial expression associated with the named phoneme is to be displayed. The phoneme name identifies both the sound segment and its associated facial expression for animation of the synactor. The sound name 831 identifies the sound resource to be used to pronounce the desired audio.

The Speech Sync Lab screen 61 displays three windows provided for the purpose of creating and editing the RECITE command. The text window 817 displays the text which is to be spoken by the synactor. The phonetic window 819 displays a phonetic translation or conversion of the text in the Text Window 817. The recite window 811 displays the RECITE command derived from the text and its phonetic translation. The RECITE command 827 can be edited directly in the recite window 811 or indirectly in the phonetic window 819.

The Speech Sync Menu 611 (FIG. 8b) is a pull down menu which is displayed on the Speech Sync Lab screen. The speech sync menu provides various menu commands for use while in the Speech Sync Lab 61. These commands allow a user to open and control the various speech synchronization windows and several special editing tools. The speech sync menu 611 is available only while in the Speech Sync Lab 61.

The Text Window menu command 613 displays the text window 817 on the Speech Sync Lab screen 61. If the text window 817 is already open, then the text window command 613 closes the text window. The Text Window 817 provides a text field 833 to enter text via the keyboard as the first step of the speech synchronization process. The text convert button 821 is provided to transform the entered text information into either or both a phonetic string or a RECITE command. If the phonetic window 819 is open, the text convert button 821 will transform the text information into phonetics and display it in the phonetic window 819. The text button 821 also transforms the text information into the associated RECITE command and displays it in the recite window 811.

Utilizing a mouse or other suitable means, a word or group of words can be selected from the text displayed in the text field 833. Depressing the keyboard Return key will highlight the phoneme/time pairs in the RECITE command 827 corresponding to the selected text. If the Phonetics Window is open, the phonetic information corresponding to the selected text will also be highlighted.

The Phonetic Window menu command 615 opens and displays the Phonetic Window 819 on the Speech Sync Lab screen 61. The phonetic window 819 is used to display and modify text from the text window 817 in phonetic form. The phonetic translation is displayed in the phonetic field and can be modified by adding, deleting or changing one or more entries in the phonetic string 835. As in the text window 817, a word or group of words can be selected from the phonetic field 835. Depressing the keyboard return key highlights the phoneme/time pairs in the RECITE command corresponding to the selected portions of the phonetic string. The phonetic convert button 823 transforms the displayed phonetic string to a RECITE command to be displayed in the recite window 811. Although this is not a necessary step, it does provide for more control in the speech synchronization process.

The Recite Window 811 displays RECITE command 827 in the recite field. A RECITE command is created by clicking on the convert button in either the text or phonetic windows. In the recite window, the RECITE command can be modified and tested. Clicking on the recite window Test button 825 will play the entire RECITE command enabling the user to see and hear the sound and animation synchronization. Alternatively, selecting the Test menu command 617 runs the animation and sound synchronization specified in the RECITE command. The test menu command 617 is available only in the Speech Sync Lab and when a sound is open. Selecting a Phonetic/Timing Value Pair or group of Phonetic/Timing Value Pairs from the RECITE command and clicking on the recite test button 825 tests only the selected portion of the RECITE command.

The RECITE command is edited or modified by changing either the phonetic name or the value of the time or both in the phonetic/time pair. Generally, the phonetic name will be correct and only the time value will require adjustment to correct for the duration of the phonetic image while displayed. Also, if a phoneme image is appearing too early or too late, the time values for phoneme/time pairs preceding the particular phonetic image will have to be adjusted.

When one or more time values have been changed, the RECITE command must be resynchronized to adjust for the changed time values. Typically, only that portion of the RECITE command following the changed time value is resynchronized. To resynchronize the RECITE command, the cursor is inserted in the phonetic/time pair sequence immediately after the changed time value and the keyboard return key is depressed. The RECITE command from the point of insertion of the cursor to the end of the sequence (left to fight) will be resynchronized.

If only a portion of the RECITE command is to be resynchronized, a stop character, ".", is inserted in the RECITE command to designate the right-most end of the resynchronization process. The Insert Stop menu command 625 inserts the stop command at the point in the RECITE command that the cursor has been inserted.

The RECITE command requires a sound name 831. The sound name identifies the sound resource which is to be used to provide the audio for the synactor. If a sound has not been opened, "????" appears rather than a sound name appears in the RECITE command. A sound resource, that is, a prerecorded, digitized sound stored in a file in RAM or ROM is opened from the Sounds Menu (FIG. 9e) described hereinabove.

If desired, rather than selecting a sound from existing sound files, a new sound can be recorded utilizing a sound digitizer. The Record Sound command from the Sounds Menu opens and displays the Digitizer Window 813 on the Speech Sync Lab screen 61. The digitizer window provides the various controls for the audio digitizer to allow a user to record a new sound for use with interFACE. (MacinTalk, a sound digitizer available from Farallon Computing, Inc. is suitable for this purpose.)

The Sampling Rate box 833 provides buttons to select from four sampling rates or to select a 4:1 compression ratio for sound recording. Sound recordings may be sampled at 22, 11, 7, and 5 KHz. Port Selector buttons are provided to designate which port the digitizer is currently connected to. The Message Field displays vital information and messages used in the recording process. The amount of time for the recording is specified (entered) in the Record Time Field 835. As a recording proceeds, the Record Time Bar 837 fills to indicate progress of the recording.

The Mouse Interrupt box 839 provides the capability to interrupt or stop a recording with the mouse at any time. If mouse interrupt is selected, moving or clicking on the mouse stops the recording process. If the Mouse Interrupt is not selected, the recording will record for the entire amount of time specified in the record time field 835.

Selecting the Auto Trim box 841 automatically clips any silence from the beginning and end of the sound after it is recorded. With Auto Trim, the resulting sound may be shorter than the time specified in the Record Time Field because of the silence removed. If Auto Trim is not selected, the entire sound including the silence is saved.

To record a sound the name of the sound is entered in the Sound Name Field 837. To begin the recording process, Click on the Record button. The message "Click to Begin" will appear in the Message Field. Then clicking on the mouse button commences the recording. The recording is terminated when the recording time ends or when a mouse movement or click interrupts the recording process if the Mouse Interrupt box 839 is selected.

After the sound is recorded, the total length of the recorded sound is displayed in the Message Field. To play back the recorded sound, click on the Play button. The recorded sound becomes the current sound for use with the RECITE command and is automatically saved to RAM or ROM under the sound name.

Figure 10:
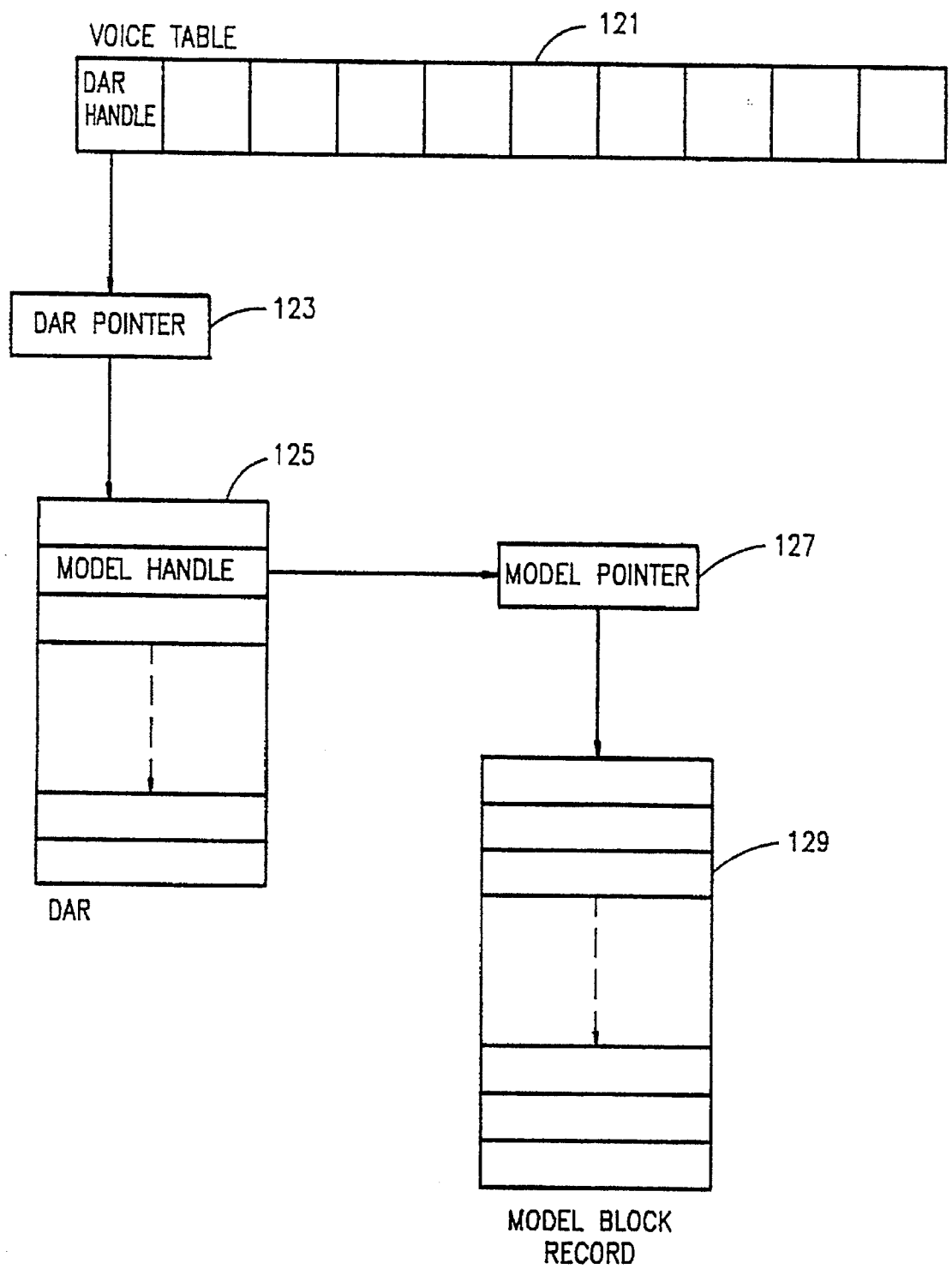
FIG. 10 is a diagram illustrating the data structure of a synactor model record according to the principles of the present invention.

Referring now to FIG. 10, a functional block diagram of the internal data structures comprising a synactor model are illustrated. The various data structures are compiled from the RAVEL source program and are stored in RAM 20 to provide the RAVE driver with sufficient data to implement its functions. A dynamically allocated synactor model is the basis for these data structures and contains one or more synactor model block records 129, one model block record for each synactor model which has been defined. The synactor model block record 129 defined for each synactor is included in that synactor's file stored in memory 39. Table VIII below lists the various fields included in the synactor model block record 129. Table III(a) provides a short definition for each field listed in Table VIII.

TABLE VIII

Model Block Record
Owner
Rules
Phoneroes
Phonemes Count
Syncopations
Syncopations Count
Lip Positions
Lip Positions Count
Betweens
Betweens Count
Width
Height
Model Flags
Position Pointers
Face Top Left
Unused Pointer
Bias Base
Unused Pointer #2
In Memory Flag
Depth
Actor Type
Coarticulatrons
Coarticulatrons Count
Coart Types
Clut Pointer

TABLE III(a)

Model Block Description

Owner—what type of voice is used by this model
Rules—location of the rules table
Phoneroes—location of the phonemes
Phonemes Count—how many phonemes used by the Model
Syncopations—location of the block of solo phoneme sound
Syncopations Count—how many syncopatrons present
Lip Positions—location of lip position block
Lip Positions Count—how many lip positions
Betweens—location of betweens face table
Betweens Count—how many betweens present
Width—width in pixels of the model
Height—height of the model in pixels
Model Flags—Model status flags
Position Pointers—locations of the faces
Face Top Left—upper left corner of face
Unused Pointer—no longer used
Bias Base—pointer to beginning of model block
Unused Pointer #2—no longer used
In Memory Flag—indicates whether or not the model is loaded into memory
Depth—Number of bits per pixel
Actor Types—indicates how many speaking/total faces present
Coartrculatrons—location of coartrculatrons block
Coartrculatrons Count—number of coartrculatrons
Coart Types—location of coart type information
CLUT pointer—pointer to table of color values used by this With continuing reference to FIG. 10, the synactor internal data structure comprises a voice table 121, a dynamic synactor record (DAR) 125 and the above described synactor model block record 129. The voice table 121 is a variable size table comprising a list of "handles" to DAR records. The voice table automatically increases or decreases in size to provide enough space for the number of synactor models currently in use. Each DAR handle describes the location of a DAR pointer 123, which holds the location of a corresponding DAR.

The DAR stores information concerning the current state of a synactor model while the synactor model is stored in memory. The DAR is created when a synactor model is first read (saved) into memory and is deallocated when the synactor model is no longer being used. One of the data fields in the DAR is a model handle which holds the location of a model pointer. The model pointer points to an associated synactor model block record 129. Table IX below is a list of the data fields contained in a DAR. Table III(b) provides a short description of each DAR field.

TABLE IX

Actor Name
Model Handle
Resource File
Face Window
Restring Face
Window Status
Layer
Locked
Purgeable
Frozen
Tred
To Which
Face Top Left
Speed
Pitch
Volume
Stored Depth
Current Width
Current Height
Current Depth
Visible

TABLE III(b)

Dynamic Actor Record Description

Actor Name—Name of the actor that Model Handle points to
Model Handle—Location of the Model Block Record
Resource File—ID of file which contains Model Block Record
Face Window—Pointer to the Model's Window
Resting Face—Which face to show when at rest
Window Status—Code which determines if model is associated with a window on the screen
Layer—which layer of windows is the Model associated with
Locked—True if the Model is locked in memory
Purgeable—True is the Model can be removed from memory
Frozen—True if the Model cannot be dragged on screen
Tied—True if the Model moves when its window is moved
To Which—Pointer to window which Model is associated with
Face Top Left—Upper-left corner of face
Speed—Current speaking speed
Pitch—Current speaking pitch
Volume—Current speaking volume
Stored Depth—original depth of this model
Current Width—Current width of this model
Current Height—Current height of this model
Current Depth—Current depth of this model
Visible—True if the Model is visible on the screen The RAVE driver access individual synactor files via the voice table 121. Similarly the RAVER driver obtains the location of the current synactor model DAR via the RAVE driver whenever a user is utilizing the RAVER driver to modify the current synactor model.

The RAVE and RAVER drivers comprise two parts, each having different functionality. The first driver/functionality is editing of synactors and editing of the sound synchronization. The second driver/functionality is to bring life to a synactor. The RAVER driver is concerned almost exclusively with creating and editing synactor models and speech synchronization while the RAVE driver is responsive to the RECITE command to pronounce the sound and to display the animated synactor in synchrony with the audio. Table IV and Table V provide a list of RAVE commands and a summary of the RAVE commands, respectively. Table VI(a) provides a brief description of the RAVER commands and Table VI(b) provides a summary of the RAVER commands.

TABLE IV

RAVE Command Table

| COMMAND | PARAMETER | RETURN | A | B | C | D | E | F |
|---|---|---|---|---|---|---|---|---|
| ACTOR | name, location | boolean | | | ✓ | | | |
| ACTOR_INFO | | 5 items | ✓ | ✓ | | | | |
| CLEAR_ACTORS | | boolean | | | | | | |
| EXPRESS | string | boolean | ✓ | ✓ | | | | ✓ |
| FREEZE | default | boolean | | ✓ | | ✓ | | |
| GET_SNAP_VALUE | | number | | | | | | |
| HIDE | name | boolean | ✓ | | ✓ | | | ✓ |
| HIDE_COPYRIGHT | | boolean | | | | ✓ | | |
| INTERMISSION | | boolean | | | | ✓ | ✓ | |
| INTERRUPTIBLE | | boolean | | | | | ✓ | |
| LIST | resource type | list | | | | | | |
| LOCK | default | boolean | | ✓ | | ✓ | | |
| MAKE_SNAP_WINDOW | | boolean | | | | | | |
| MOVE | location | boolean | ✓ | ✓ | | | | ✓ |
| NEW_REST | label | boolean | ✓ | ✓ | | | | |
| PHONETIC | phonetic text | boolean | ✓ | ✓ | | | | ✓ |
| PITCH | number | boolean | | ✓ | | ✓ | | |
| RECITE | string | boolean | | ✓ | | | | ✓ |
| RECITE_PARTIAL | string | boolean | | ✓ | | | | ✓ |
| RETIRE | name | boolean | ✓ | | ✓ | | | ✓ |
| SCREEN_RELATIVE | default | boolean | | ✓ | | ✓ | | |
| SHOW | name | boolean | ✓ | | ✓ | | | ✓ |
| SPEED | number | boolean | | ✓ | | ✓ | | |
| STATUS | | 6 items | | | | | | |
| text | string | boolean | ✓ | ✓ | | | | ✓ |
| TIE | default | boolean | | ✓ | | ✓ | | |
| TOP_LAYER | default | boolean | | ✓ | | ✓ | | |
| UNFREEZE | default | boolean | | ✓ | | ✓ | | |
| UNINTERRUPTIBLE | | boolean | | | | | ✓ | |
| UNLOCK | | boolean | | ✓ | | ✓ | | |
| UNTIE | default | boolean | | ✓ | | ✓ | | |
| UPDATE | name | boolean | ✓ | | ✓ | | | ✓ |
| USE | name | boolean | ✓ | | ✓ | | | |
| VISABLE | | boolean | ✓ | ✓ | | | | |
| WINDOW_LAYER | default | boolean | | ✓ | | ✓ | | |
| WINDOWLESS | | boolean | | | | | | |
| WINDOW_RELATIVE | default | boolean | | ✓ | | ✓ | | |

A Requires actor.
B Works on current actor.
C Works on named actor.
D Sets default.
E Global setting.
F Animates.

TABLE V

RAVE Commands Summary Table

| COMMAND NAME | PARAMETERS | RETURN VALUE |
|---|---|---|
| ACTOR | name, left, top | T/F |
| ACTOR_INFO | none | name,w,h,depth,size |
| AUTOTRIM | # | T/F |
| BLOCKPTR | # | T/F |
| CD_EXPRESS | m,s,ab,image/timing value string | T/F |
| CD_PLAY | m,s,b | T/F |
| CD_RECITE | m,s,b,image/timing value string | T/F |
| CD_STOP | m,s,b | T/F |
| CLEAR_ACTORS | none | T/F |
| CLOSEACTORFILE | none | T/F |
| CLOSESOUNDFILE | none | T/F |
| CONVERT | text string | phonetic string |
| COPY | new/next image # | T/F |
| COPYACTOR | none | T/F |
| COPYEMPTY | none | T/F |
| COPYSOUND | none | T/F |
| CUT | none | T/F |
| DELETEACTOR | name | T/F |
| DELETESOUND | name | T/F |
| DIGIMAKE | snd name, image/timing value string | image/timing value string |
| DIGIMAKE2 | snd name,#,image/timeing value string | image/timing value string |
| EDITINFO | none | spk#,curFace,tot,l,t,w,h,d,s |
| EXCHANGE | none/# | T/F |
| EXPORT | none | T/F |
| EXPRESS | image/timing value string | T/F |
| FNORD | on/off/# | T/F |
| FREEZE | none/default | T/F |
| GETEXCHANGE | none | T/F |
| GET_REF | actor/sound | # |
| GET_SNAP_VALUE | none | # |
| GRAPHIC_EMPTY | none | T/F |
| HIDE | none,name | T/F |
| HIDE_COPYRIGHT | none | T/F |
| IMPORT | none | T/F |
| INTERMISSION | none | T/F |
| INTERRUPTIBLE | none | T/F |
| LIST | none,actor,sound | actors,sounds |
| LOCK | none/default | T/F |
| LOOP_EXPRESS | image/timing value string | T/F |
| MAKE_SNAP_WINDOW | none | T/F |
|  | left,top | T/F |
| MOVE | image | T/F |
| NEW_REST | none | T/F |
| OPENACTORFILE | none | T/F |
| OPENSOUNDFILE | image # | T/F |
| PASTE | text string | T/F |
| PATCH | phonetic text | T/F |
| PHONETIC | # | T/F |
| PITCH | none/default | T/F |
| PURGEABLE | snd name, image/timing value string | T/F |
| RECITE | snd name, #, image/timing value string | T/F |
| RECITE_PARTIAL | name | T/F |
| RECORDEDSOUND | none | T/F |
| REST2ALL | name | T/F |
| RETIRE | name | T/F |
| SAVE | name | T/F |
| SAVEAS | none,default | T/F |
| SCREEN_RELATIVE | none,name | T/F |
| SHOW | # | T/F |
| SPEED | none | T/F |
| STATUS | none | T/F |
| SYNCSOUND | text | T/F |
| text | none/default | T/F |
| TIE | none/default | T/F |
| TOP_LAYER | none/default | T/F |
| UNFREEZE | none/default | T/F |
| UNINTERRUPTIBLE | none/default | T/F |
| UNLOCK | none/default | T/F |
| UNPURGEABLE | none/default | T/F |
| UNTIE | name in # | T/F |
| UPDATE | name | T/F |
| USE | none | T/F |
| VISIBLE | none/default | T/F |

TABLE V-continued

RAVE Commands Summary Table

| COMMAND NAME | PARAMETERS | RETURN VALUE |
|---|---|---|
| WINDOW_LAYER | none/default | T/F |
| WINDOW_RELATIVE | none | T/F |
| WINDOWLESS | | |

TABLE VI(a)

RAVER Commands Summary

AUTOTRIM—trim leading and trailing silence from a recorded sound
BLOCKPTR—give driver access to the caller's data and routines
CLOSEACTORFILE—close the currently open actor file
CLOSESOUNDFILE—close the currently open sound file
CONVERT—convert a text string to phonetic equivalents
COPY—copy an image
COPYACTOR—copy an actor resource from one file to another
COPYEMPTY—erase the current face, and the easel graphic
COPYSOUND—copy a sound resource from one file to another
CUT—cut an image
DELETEACTOR—remove an actor resource from a file
DELETESOUND—remove a sound resource from a file
DIGIMAKE—convert a phonetic string into a recite string
DIGIMAKE2—convert a phonetic string into a recite string
EDITINFO—provide info about current actor: size, # faces, #speaking faces
EXCHANGE—get access to rave driver actor info
EXPORT—copy faces from an actor into a scrapbook file
FNORD—install a patch routine for debugging
GETEXCHANGE—get access to RAVE driver actor info for debugging purposes
GET_REF—tell the caller which file to get the actor resource from
GRAPHIC_EMPTY—return true if the specified graphic is empty
IMPORT—read in images from a scrapbook file
OPENACTORFILE—open a file and use actors from that file
OPENSOUNDFILE—open a file and use sounds from that file
PASTE—paste an image from the clipboard into the actor
PATCH—install a patch routine
RECORDEDSOUND—close previous sound file, and tell driver to use new. one
REST2ALL—copy the rest image to all the images
SAVE—save the current actor to disk
SAVEAS—choose a file and a name, and save the actor to them
SYNCSOUND—prep sound for speech sync TABLE VI(b)

RAVE Commands Summary

| COMMAND NAME | PARAMETERS | RETURN VALUE |
|---|---|---|
| AUTOTRIM | # | T/F |
| BLOCKPTR | # | T/F |
| CLOSEACTORFILE | none | T/F |
| CLOSESOUNDFILE | none | T/F |
| CONVERT | text string | phonetic string |
| COPY | new/next image # | T/F |
| COPYACTOR | none | T/F |
| COPYEMPTY | none | T/F |
| COPYSOUND | none | T/F |
| CUT | none | T/F |
| DELETEACTOR | name | T/F |
| DELETESOUND | name | T/F |
| DIGIMAKE | snd name, image/timing value string | image/timing value string |
| DIGIMAKE2 | snd name,#,image/timeing value string | image/timing value string |
| EDITINFO | none | spk#,curFace,tot,l,t,w,h,d,s |
| EXCHANGE | none/# | T/F |
| EXPORT | none | T/F |
| FNORD | on/off/# | T/F |
| GETEXCHANGE | none | T/F |
| GET_REF | actor/sound | # |
| GRAPHIC_EMPTY | none | T/F |
| IMPORT | none | T/F |
| OPENACTORFILE | none | T/F |
| OPENSOUNDFILE | none | T/F |
| PASTE | image # | T/F |
| PATCH | text string | T/F |
| RECORDEDSOUND | name | T/F |
| REST2ALL | none | T/F |
| SAVE | name | T/F |

TABLE VI(b)-continued

RAVE Commands Summary

| COMMAND NAME | PARAMETERS | RETURN VALUE |
| --- | --- | --- |
| SAVEAS | name | T/F |
| SYNCSOUND | none | T/F |

The preferred embodiment of the present invention provides several modes for generating speech synchronized animation. The basic mode for speech synchronization is referred to as phonetic proportionality. The phonetic proportionality method is the primary mode for speech synchronization utilized in the Speech Sync Lab 61 and is described briefly below. A more detailed, complete discription is provided in the above referenced U.S. patents incorporated herein.

A user enters desired text which is to be pronounced by a synactor. A corresponding prerecorded, digitized sound resource is retrieved from RAM or ROM and it's length in time ticks (60ths of a second) is measured and stored. Then, utilizing a phonetic string that corresponds to the entered text (and the recorded sound), the corresponding sound utterances from the sound resource are converted to a list of phocodes. The phocodes thus derived are then mapped to a look up table of relative timing values which provides a time value for each associated synactor face or position image. The timing value table can be coded in the interFACE program for general use or generated from the RAVEL file using extensions to the RAVEL language to provide a unique voice for a synactor model. Thus synactors can be provided with voices having varying accents, drawls and other speech mannerisms or languages.

During the speech synchronization process, this table is utilized to look up timing values for each phocode. Each line or entry in the table represents a phocode and its associated relative timing value. The first line is all null characters and is used as a place holder so that the indexing of phocodes will be useful numbers. The first character is the first letter corresponding to the phocode, the second character is the second letter corresponding to the phocode, if there is one, or an end of string character. The third character in each line is an end of string character for the two-letter phocodes or a space filler. The fourth character is the relative timing value associated with that phocode. The last line is again all null to mark the end of the table.

Once the two parallel lists, phocodes and relative timings, and the length of the associated sound have been established, the actual process of synchronizing the speech to the animation is initiated by refining the timing list. The first step is to calculate the sum of all the values in the timing list. The sum is then compared to the sound length. The timing value given to each phocode is then adjusted proportionately with the compared sums and rounded to whole numbers. If the total of the timings is less than the sound length, then the timings are incremented until the total of the timings match the total sound length. If the total of the timings is greater than the total sound length, then the timings are similarly decremented until they match. This is done to deal with cumulative rounding errors because the timings must be integer values so the RAVE real time phase can operate.

The result is a list of phocodes and associated timing values which represent the synchronization of the synactor facial images to the corresponding sound. To create a RECITE command, the phocodes are used again to look up the corresponding phonetic codes to form phonetic code/ time value pairs. The RECITE command will coordinate the actual sound/motion combination. The user can edit the command on the screen to fine tune it, test it, and edit it more until it looks satisfactory. (Editing is particularly useful for unusually-timed speech segments, for example, with one word pronounced more slowly or differently, or with silences or throat clearings not reflected in the text and/or not amenable to speech recognition.) To help a user fine tune the RECITE command, the interFACE system provides methods, described hereinabove, to isolate, test, and/or programmatically resynchronize individual portions of the sound and animation.

In the Stage mode 63, the voice utilized for a synactor in the sound-animation synchronization process is provided by an independent voice synthesizer rather than by the prerecorded, digitized RAVEL sound resources. In the preferred embodiment, the interFACE system supports both the MacinTalk and the BrightTalk speech synthesizers.

Since a given voice synthesizer generates a unique set of phonemes particular to that voice synthesizer, the set of phonemes utilized by the interFACE system for a synactor model may be different and therefore one or more phonemes generated by the voice synactor corresponding to a text string may not be recognized by the interFACE system. The RAVE driver is synchronized with any voice synthesizer by creating two tables for a particular voice synthesizer in use. The first table, referred to as the voice reconciliation phoneme table, represents all phonemes that the particular voice, that is, the voice synthesizer, is capable of generating. The second table, referred to as the generic phoneme table, is similar to the voice reconciliation phoneme table except that it substitutes equivalent phonemes from the synactor model resource in place of unrecognized phonemes generated by the voice synthesizer. The entries in the generic phoneme table are in the same order as the corresponding entries in the voice reconciliation table to provide a one-to-one mapping between the two tables. These two tables are stored as resources and adapted for each unique voice synthesizer supported by the interFACE system.

When generating speech synchronized animation using a voice synthesizer, the phoneme table for the synactor model, the voice reconciliation table, and the genetic phoneme table are used to create a runtime reconciled phocode table that enables the interFACE system to work with any voice synthesizer without the need to modify the existing synactor phoneme table.

The runtime reconciled phocode table is allocated the same size as the voice reconciliation phoneme and genetic phoneme tables so that there will be a one-to-one correspondence between all three tables. Each phoneme in the genetic phoneme table is looked up in the synactor model phoneme table to get its equivalent phocode. The phocode position is then stored in the runtime reconciled phocode table at the same relative position as its phoneme equivalent in the genetic phoneme table.

Thus, when using a voice synthesizer instead of looking up phonemes in the synactor model phoneme table to get equivalent phocodes, phonemes will be looked up in the voice reconciliation phoneme table to get their positions in the runtime reconciled phocode table which, in turn, provides the phocode position in the synactor model phoneme table used for the interFACE process. FIG. 17 illustrates a voice reconciliation phoneme table and a genetic phoneme table.

The interFACE system allows a user to create three different classes of synactors. These classes are referred to as synactor types and are differentiated by the number of assigned speaking images. The three types of synactors are referred to as Standard, Extended and Coarticulated. Each synactor type provides an increased number of speaking images over the previous type.

The most simple synactor type, standard, provides reasonable animation ability with minimal user effort and minimal system memory usage. A standard synactor provides eight images devoted to speaking and at least eight expression images. The total minimum number of images for a standard synactor is 16.

The extended synactor type is a middle track between the standard and coarticulated types. Seven additional images devoted to speaking are added to the images provided by the standard synactor type to create the extended type. The extended type, therefore, provides nearly twice as many speaking images. The additional images enable synactors to provide more realistic speech animation than standard types. Extended synactors also require at least one expression image to provide the minimum 16 of synactor images.

The most complicated synactor that can be created in the interFACE system is the coarticulate synactor type. Coarticulated synactors provide 32 speaking images. For speaking, coarticulated synactors provide the best possible animation because each speaking image varies as a function of the phoneme context of the sound utterance as well as its primary associated phoneme.

To create more natural animation, the RAVE driver includes facilities to handle variations in facial positioning that occur as a result of coarticulation. Coarticulatory patterns of speech exist when two or more speech sounds overlap such that their articulartory gestures occur simultaneously. To some extent, this affects practically all natural speech sounds. A major effect is of the lip, jaw, and tongue position of various vowels on the articulator's position for consonant production. A dramatic example of this is to compare the lip configuration in forming the consonant "b" when it is in the following vowel environments, for example, "eebee" compared with "ooboo". There are two major types of coarticulation, both of which are operating at the same time. Inertial Coarticulation is the result of the articulatory apparatus (i.e., lips and face) being a mechanical system, i.e. "mechanical slop". The articulator positions for a previous sound are retained and affect the articulator positions of the next sound. Anticipatory coarticulation is the result of neural control and preplanning for increased efficiency and speeds of articulator movement, i.e., natural articulators are controlled in parallel. The articulator positions for the target sound are affected by the anticipated positions for the next sound.

Rather than adding new images to provide more complex animation (as was done with the extended type), the coarticulated synactor type provides variations on existing consonant face positions. The two variations are known as retracted and protruded images and are generated by folding or merging existing facial images to reduce the overall number of images required to be stored in the system. The coarticulated synactor type does not require any default expression images. Any number of expression images may be added while in the Dressing Room 59.

Referring to FIG. 11, exemplary speaking images are illustrated. A speaking or key image for each synactor speaking position is provided along with sample words and suggestions for use of each key image. A complete listing of available speaking images for the preferred embodiment is provided in the "User's Guide" previously incorporated by reference.

Table X, below, provides a synactor overview which summarizes which speaking images are available for use with each of above-described synactor types. For example, the REST image (#1) is used with all three synactor types: standard(s), extended (E) and coarticulated (C). By contrast, the OH image (#9) is available only with the extended (E) and the coarticulated (C) synactor types.

TABLE X

| # | Image | S | E | C |
|---|-------|---|---|---|
| 1 | Rest | X | X | X |
| 2 | F | X | X | X |
| 3 | M | X | X | X |
| 4 | R | X | X | X |
| 5 | W | X | X | X |
| 6 | IH | X | X | X |
| 7 | AH | X | X | X |
| 8 | E | X | X | X |
| 9 | OH |   | X | X |
| 10 | S |   | X | X |
| 11 | D |   | X | X |
| 12 | T |   | X | X |
| 13 | C |   | X | X |
| 14 | L |   | X | X |
| 15 | K |   | X | X |
| 16 | F< |   |   | X |
| 17 | M< |   |   | X |
| 18 | M< |   |   | X |
| 19 | S< |   |   | X |
| 20 | D< |   |   | X |
| 21 | T< |   |   | X |
| 22 | C< |   |   | X |
| 23 | L< |   |   | X |
| 24 | K< |   |   | X |
| 25 | F> |   |   | X |
| 26 | M> |   |   | X |
| 27 | S> |   |   | X |
| 28 | D> |   |   | X |
| 29 | T> |   |   | X |
| 30 | C> |   |   | X |
| 31 | L> |   |   | X |
| 32 | K> |   |   | X |

Table VII provides a listing of short phrases which facilitates easy extraction of the proper speaking images from a sound (or video) recording.

TABLE VII

| The Word List |
|---|

2 3 4
He fought balmy rot 5 6 7 8 9
Where it ought to have easily oozed over 10 11 12 13
Saul dotted thoughts of shock 14 15 16 17
Lofty gods feeding beef 18 19
To reaching seals 20 21 22
I need these sheep TABLE VII-continued The Word List

| | | | |
|---|---|---|---|
| 23 | 24 | | |
| To leave their keys | | | |
| 25 | 26 | 27 | 28 |
| Fools putting soup dough | | | |
| 29 | 30 | | |
| Though chosen | | | |
| 31 | 32 | | |
| Loose goats | | | |

The words and phrases provide instances of all lip positions required in the standard, extended and coarticulated synactor types. The corresponding speaking image number for the desired lip position is listed above the appropriate speech or word segment.

RAVEL language source code providing synactor model definitions for each synactor type described above are provided in FIGS. 14–16.

Graphical Speech Segmentation

Figure 12:
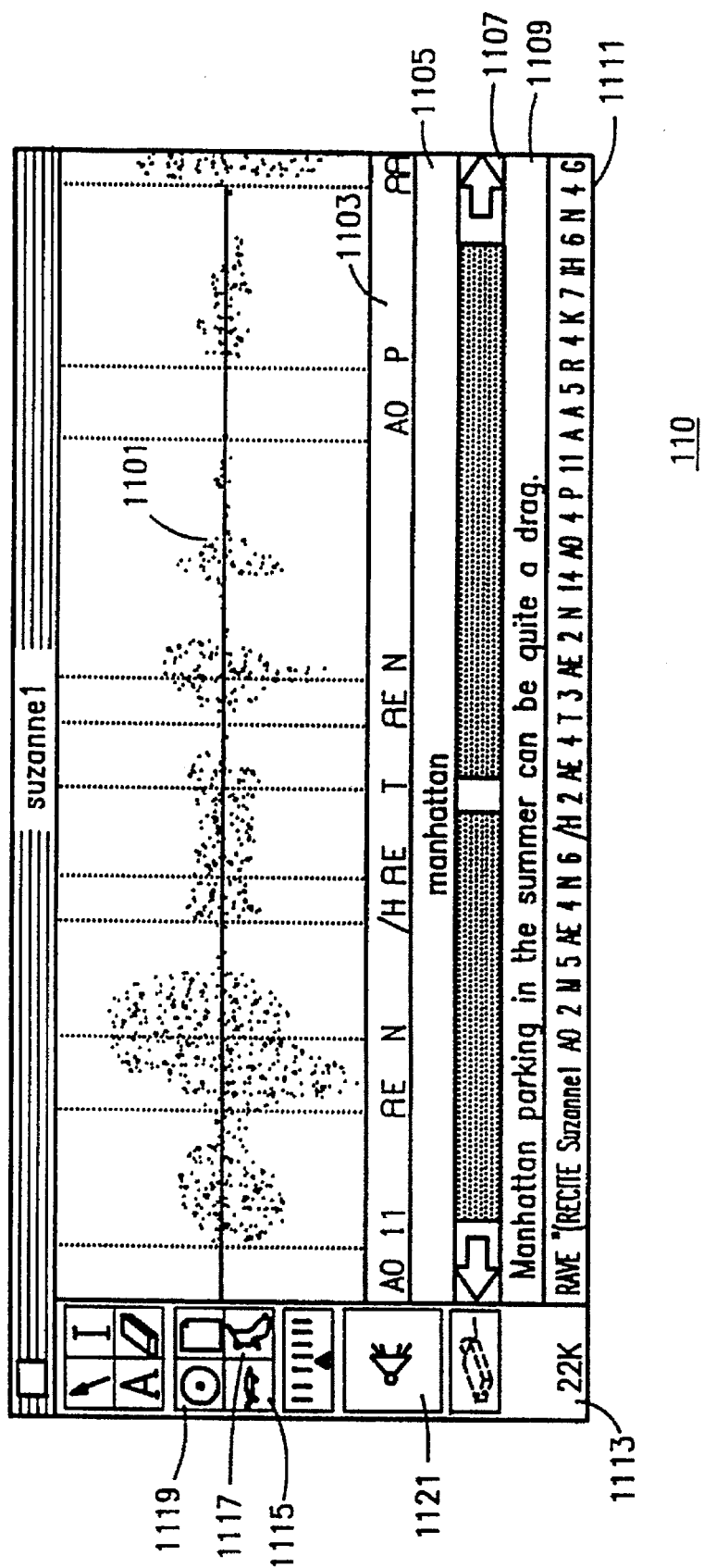
FIG. 12 is a diagram illustrating a digital representation of a sound sample.

Referring now to FIG. 12, the Graphical Use Interface for Speech Synchronization (GUI speech sync mode) provides a window 110 in which the computer speech synchronization process is displayed. The GUI speech sync mode is initiated by a user from the Speech Sync Lab 61 via the speech sync menu (as shown in FIG. 8b). The GUI speech sync mode provides an alternate method for creating and editing the RECITE command. Utilizing the GUI speech sync window 110, the user can visually edit the RECITE command to provide highly accurate speech synchronization.

The GUI Speech Sync window displays a digital representation 1101 of the current sound. The digital sound wave representation 1101 is generated by the system microprocessor utilizing well-known analytical techniques. Beneath the digital sound display 1101 a Phoneme Field 1103 is provided which illustrates the spatial relationship between phenemes (which represent facial images) and the components of the displayed digital sound wave 1101. A text field 1105 immediately below the phoneme field 1103 displays the word or words the displayed digital wave 1101 and phonemes represent for easy identification. The GUI speech sync window 110 also includes a standard scroll bar 1107 for working with sounds that are too large to be represented entirely within the window. Beneath the scroll bar are two fields 1109, 1111 for entering the text string representation of the sound and for displaying the RECITE command, respectively. The RECITE command can be edited or modified either by changing the timing values in the command or by using the cursor to adjust the position of the phenemes displayed in the phoneme field 1103 with respect to the associated digital acoustic wave representation 1101. A change in either field will cause the other field to update appropriately. The user may also request bar indicators to be drawn from the location of the phonemes on the acoustic wave representation.

Using a mouse or other suitable input means, a user can select any component of the above described fields. Any such selection will cause corresponding selections to appear in the remaining four fields. For example, when a word or character string is selected from the entered text in the text field 1109, the RAVER driver automatically displays the corresponding digital representation and computes and displays the phonemes and the RECITE command. The RECITE command timing values can then be edited to provide more accurate synchronization. Clicking on the play button 1121 with a selection active will play/animate that selection.

Two modes of speech synchronization are provided by the GUI Speech Sync window: fast and slow automatic speech synchronization. The user selects the desired speech synchronization mode utilizing the "turtle" or "hare" icon, 1115 or 1117, respectively, or other suitably designated icon, from the speech sync control window 1113. Fast synchronization is quick, but not accurate. Slow synchronization is slow but yields better results.

The GUI speech sync window 110 provides the capability for a user to work with RAVE sound resources stored in RAM or ROM or externally available sounds recorded on industry standard compact disc (CD) or other storage media. Sound samples provided by an external source must be provided in acceptable digital format in order for the processor to generate the digital audio signal 1101 for display by the GUI screen 110. Prerecorded or real time sound samples may be input via the audio input and digitizer circuits 9 and 8, respectively. Alternatively, digitized sound may be directly input via an audio digitizer 6, such as a MacRecorder, under control of the Speech Sync Lab 61. A record button 1119 enables the user to record and synchronize sounds directly within the GUI Speech Sync window 110. Multiple GUI Speech Sync windows may be opened when working with more than one sound or types of sound.

Dendrogramic Segmentation

Referring now to FIGS. 13a–13d, digitized speech may also be synchronized with phonetic images utilizing techniques referred to as "speech segmentation" from the art of signal processing. One technique which has provided good results with respect to the task of phonetic recognition utilizes a dendrogramic representation to map segments of an acoustical signal to a set of phonological units, phonemes, for example. Utilizing dendrogramic methodology, a continuous speech signal is segmented into a discrete set of acoustic events. The segmentation process is then followed by a labelling process, that is, assigning phonetic labels, phenemes, to each of the segments. Such dendrogramic representations are well-described in the literature, for example, see Glass, J. R. and Zue, V. W., "1988 International Conference on Acoustics, Speech, and Signal Processing" (ISASSP 88), Vol. 1, pages 429–432. Glass et al and others represented the speech signal by Discrete Fourier Transforms. Utilizing Auto-Regressive parameterizations (LPC) as a basis, good results have been obtained building dendrograms to perform both manual and automatic speech segmentation. Speech segmentation provided by such dendrogramic methods is readily adaptable to speech/animation synchronization systems.

In the interFACE system, the dendrogramic methodology described above has been implemented to provide an alternate mode of speech synchronization. The Dendrographic mode of speech synchronization is initiated by a user from the Speech Sync Lab 61 via the "Dendrogram" command 631 provided by the speech sync menu 611 (as shown in FIG. 8b). When the Dendrogram mode is selected, the desired speech utterance is automatically segmented via the dendrogram process by the microprocessor utilizing well-known algorithms. Once the various phenemes are identified, the RAVER driver computes the corresponding RECITE command with the time values for each phonetic code derived from the relative position in the dendrogram of the associated phoneme with respect to the overall time for the sound utterance respected by the horizontal axis of the dendrogram.

Essentially, for each sound utterance to be segmented, a digital sound sample is first sampled at 11 kHz. Next, an 8-parameter PARCOR representation is calculated every $1/120$ second using a triangular window $1/60$ second wide. The PARCOR parameters are then converted to log-area-ratios and a dendrogram is built using a standard Euclidean norm to associate the resulting representational vectors.

Figure 13A:
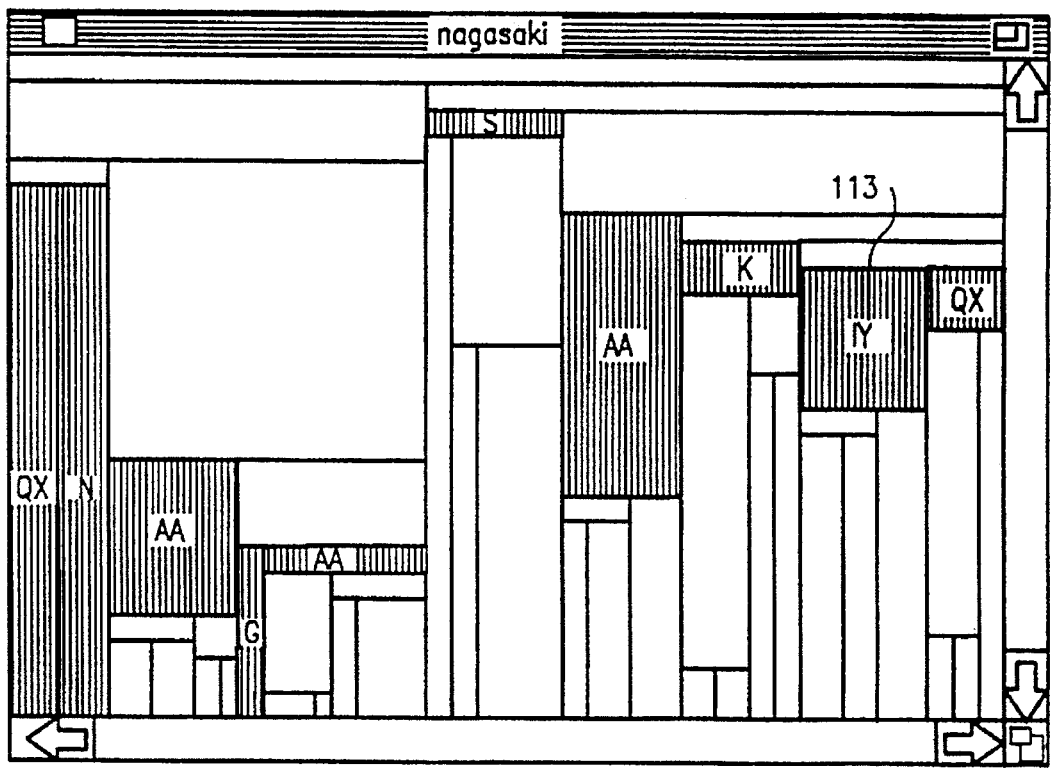
FIGS. 13a–13d are dendrogramic representations of acoustic segmentation for selected sound samples.

Referring now to FIG. 13a, a screen display of a dendrogram derived from a recording of the Japanese sound utterance "nagasaki" is illustrated. The dendrogram contains nodes (represented as variously sized, shaded rectangles) corresponding to various subsections of the sound utterance, including the desired phonetic images. By selecting relatively simply choice-matting commands provided by a Dendrogram Menu (not shown) a user can manually trace a path across the dendrogram corresponding to the phonetic stream present in the sound utterance. The user can listen to any node by selecting it and initiating a "Play Node" menu command. The user can force the path across the diagram to flow through the selected node via a "Use Node" menu command. The phoneme stream can also be modified to delete poorly articulated phonemes or to include additional phonemes with an "Edit Labels" menu command. The user can then convert the labeled path into the RECITE image/timing pair string that can then be tested and fine-tuned for use with the sound by using "Make Recite" and "Edit Recite" menu commands.

Figure 13B:
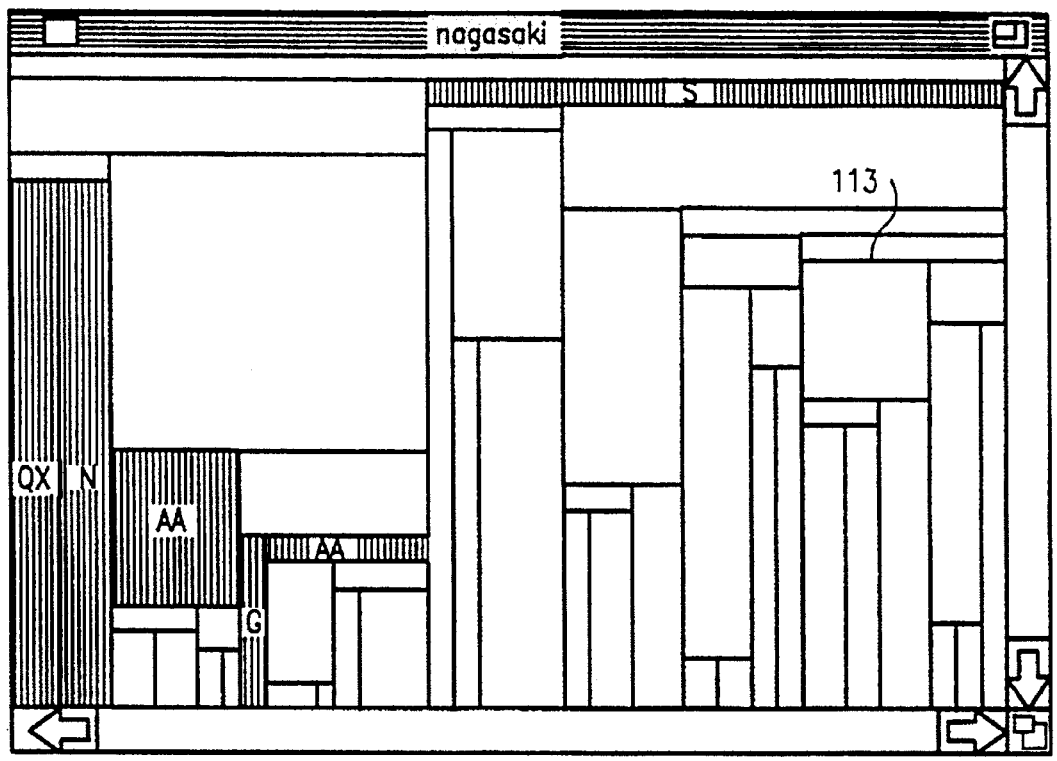

Referring now to FIG. 13b, a dendrogram diagram part way through the manual labeling process is shown. The user has already identified-the nodes representing the phonemes "QX", "N", "AA", "G" and "AA". By using the "Play Node" command the user has determined that the selected node (the node with the thick black border) 113 is the terminal "TY" phoneme in "nagasaki". The user now initiates a Use Node command which instructs the RAVER driver to change the path so that it flows through the selected node. This forces a number of other nodes to be automatically added to the diagram with the results as shown in FIG. 11a. As a result of this choice the rest of the diagram is now correctly labelled.

Figure 13C:
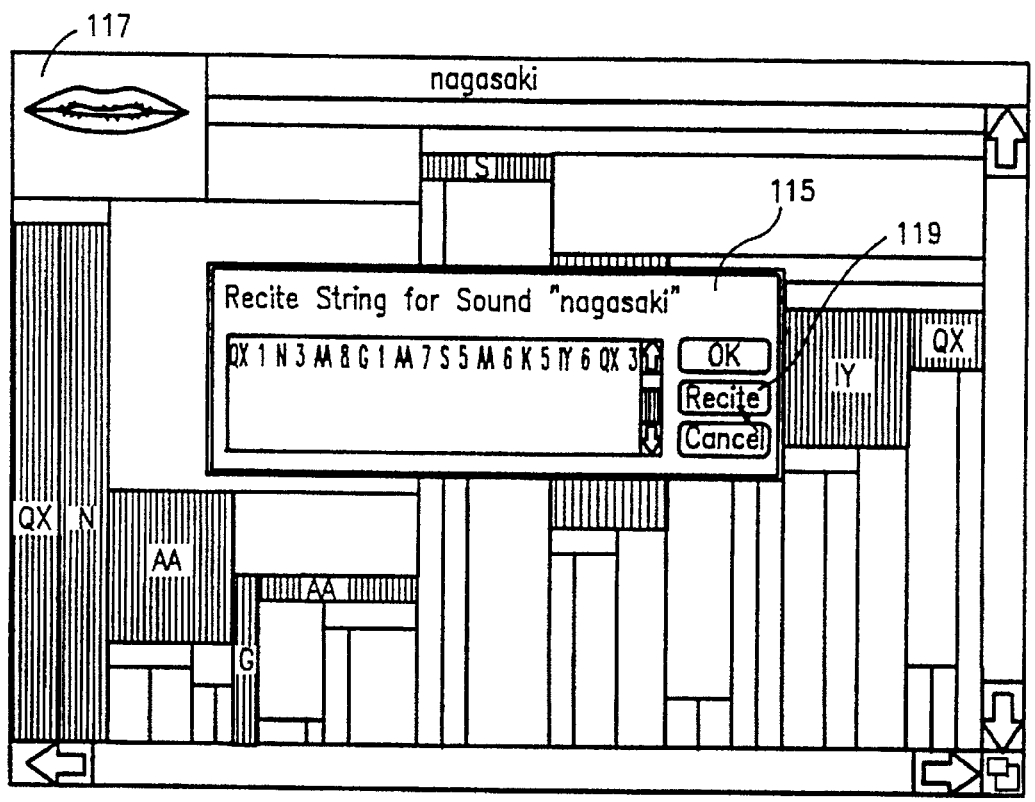

Referring now to FIG. 13c, a screen display of the RECITE timing values editor window 115 is shown. The user has used the "Make Recite" command to generate a RECITE command from the durations of the nodes and their phonetic labels and has initiated the editor window 115 via the "Edit Recite" command. In a manner similar to the interFACE basic speech synchronization mode, the user can test the phonetic/timing set with the displayed synactor lip images 177 by pressing the Recite button 119. The animation may be improved or modified by text editing to adjust the displayed phonetic/timing values as desired.

Figure 13D:
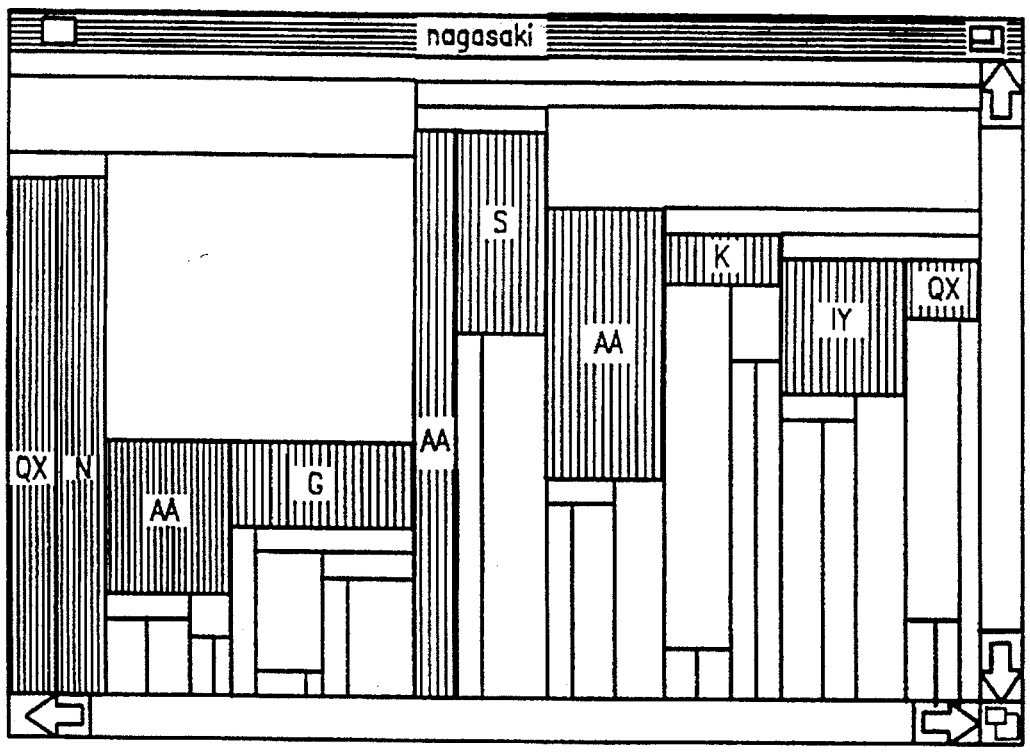

Referring now to FIG. 13d, a screen display of a second dendrogram derived from a recording of the Japanese utterance "nagasaki" is shown. The user has changed the locations of the phoneme sequence "G AA S" from that illustrated in FIG. 13a. Utilizing the editor window 115, the user can generate and test a new RECITE command corresponding to the modified dendrogram as described with regard to FIG. 13c.

Each node of a dendrogram has a vector associated with it which describes the "average" of its constituent blocks (this vector could be an LPC parameterization, FFT, etc.). During a training process, a user can select several examples of each phoneme and average the vectors corresponding to each example to obtain a centrodial representational vector for the phoneme. The set of centrodial vectors and other values, such as the volume of the phoneme in the representation space, can be retained for later use in the automatic segmentation process.

Once a table of averages and related values has been computed and stored, it can be used to automatically segment a sound utterance via its dendrogram. One such automatic method comprises finding all paths across a sound utterance's associated dendrogram which have the right number of nodes and then weigh each path by how well each node corresponds to the target phoneme. One method for weighing each path is would be to calculate the difference for each node vector from the corresponding training vector under a Euclidean norm and then sum the squares of the differences. The final sum is then weighted by the size of the training region for each target phoneme, allowing phonemes with larger variation in their realizations (size) in the target space to be deemphasized and those with smaller variations to be emphasized.

CD Synchronization

The interFACE system also provides an alternate mode of speech synchronization which synchronizes animation with desired sound samples provided by external storage devices. A CD Synchronization Mode (CD sync mode) is initiated from the Speech Sync Lab 61 via the CD Recite menu command 629 from the speech sync menu 611. The CD sync mode provides the capability to utilize any external audio signal as the source of the sound to be synchronized. In the CD sync mode, the sound does not require CPU or microprocessor processing and reduces the system requirements for digitized sound resources stored in RAM or ROM. As shown in FIG. 3, the audio signal from the sound source is input directly to a audio output means, such as a speaker 3, while the real-time coordinator 43 coordinates the audio with the displayed animation as described in more detail hereinbelow.

Currently available mass storage devices include compact disc drives (CD drives) which utilize CDs to provide ROM for storing data and other information for retrieval by a computer. Compact discs are also widely used by the entertainment industry to store music and other sound data for playback through conventional sound reproduction equipment. Many CD drive peripherals can also be configured to act as sound-playback devices under computer control, often with minimal CPU or microprocessor supervision. An audio signal provided by such a CD drive can be synchronized with other activities performed by the microprocessor, including (but not limited to) facial animation.

One problem that arises with such audio synchronization is that the time required for the CD drive to find the start of a desired audio selection (seek time) is often both relatively long (in terms of microprocessor execution times) and indeterminate (often with a range of several orders of magnitude). Moreover, while most of these devices can be accurately polled by the microprocessor in a simple manner for the current playback head location during playback, a device will often report that it is at the start of the desired selection significantly prior in time to actual production of the audio output signal (for example, some devices will report that they are at a location while, in actuality, they are currently seeking the location). A more complex inquiry by the microprocessor to determine when audio output commences is one solution. However, for some applications, facial animation in particular, a simpler approach is described hereinbelow provides sufficient results.

The industry standard for the addressing of audio data on a CD specifies that data is addressed by a time value representing a duration from the start of the disk. Such durations are specified by three values, namely minutes, seconds and blocks, with a block being 1/75 second. Synchronizing a microprocessor controlled task with the audio would typically consist of the microprocessor instructing the CD device to start audio output at a specified time address, waiting until the device had actually started playing (assuming that the microprocessor/device polling cycle is short compared to device seek time and real time) and then commencing the synchronized task(s), possibly involving subsequent polling of the CD device to allow precise synchronization of later tasks.

As mentioned above, polling the CD device for the actual start of playback is typically a more complex process than polling for read head location. On the other hand, once playback has started, polling for read head location is generally accurate to 1/75 second. When this is an acceptable error for the synchronization task, a more complex polling situation can be avoided by starting the initial synchronization task one block late. This is acceptable because while the device's report of "first block playing" is probably inaccurate, the report of "second block playing" is accurate to 1/75 second. This value is acceptable for image display as the human eye has a refresh rate of 1/30 second.

Referring now to FIG. 18, a listing of microprocessor instructions in C language is provided for accomplishing this task. (Most of the calculations in this code are to convert an absolute block count into the minute/second/block format required by the device control subroutines, i.e. all routines beginning with "zCDROM_"). The first section of the code instructs the CD device to start playing from absolute block number, "startBlock" (the "start playing" command is asynchronous and subroutine call will return before the command is actually executed). Note, after instructing the CD device to start playing, startBlock is incremented by 1 block for the synchronization process. The second section of code polls the CD device for its current playing location and waits until the current playing address (atCount) is greater than or equal to the synchronization address (startCount). Because startCount was incremented by one block after the play command was initiated, this code waits until the device is playing the second audio block. After the loop terminates, the synactor animation coordinator (real-time coordinator 43) is sent a synchronization signal instructing it to display the first frame of animation (s_bumper_proc).

Figure 9K:
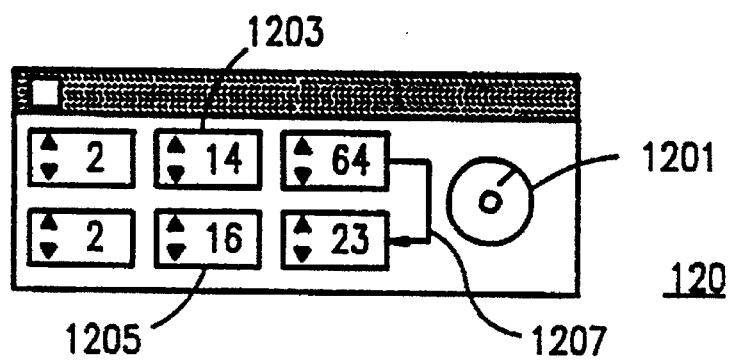

Referring now to FIGS. 8a, 8b and 9k, a CD Speech Sync Palette 120 (CD palette) for controlling the playing of audio segments from a CD drive is shown. Selecting the CD Recite menu command 629 initiates the CD sync mode from the Speech Sync Lab 61 and displays the CD palette 120.

The CD palette is used to define a single linear segment of sound to be played from a CD or other suitable source. It provides two groups 1203, 1205 of three fields each. The fields represent the three values necessary to reference time on a CD: minutes, seconds and block. The first set 1203 of fields is used to select the starting point of the audio segment. The second set 1205 is used to select the end point of the audio segment.

With a mouse or other input device, clicking on the CD play button 1201 will start the CD playing the segment referenced by the starting and end point fields. To aid in entering the time values, a copy button 1207 is provided to dump the contents of one set of fields to the other set of fields. Up and down arrows are provided for changing the values of each field.

When in CD sync mode, the text string corresponding to the desired sound segment on the CD is entered in the text window 817. The text window convert button 821 then uses the playing length (time) of the sound segment derived from the CD Palette fields 1203, 1205 for the synchronization process. Utilizing the basic interFACE synchronization process, referred to as phonetic proportionality, a CD RECITE command is generated and displayed in the Recite window.

FIG. 19 provides a script flow that will implement the above-described functionality. A CD RECITE command differs from a traditional RECITE command in that it has no sound name but does contain the starting point (minutes, seconds, blocks) that was entered in the CD palette field 1203 at the time the convert button was activated. The rest of the CD RECITE command contains the phoneme/timing value string. The timing values add up to the total length of the desired segment of sound. The time value for each phonetic code is assigned in accordance with its relative timing value for the associated facial image. Upon execution, the CD RECITE command starts the CD playing at the starting point and simultaneously displays the synactor animation according to the animation string and stops the CD after the last phoneme/timing value pair has been executed.

While the present invention has been particularly shown and described with respect to certain preferred embodiments thereof, it should be readily apparent to those of ordinary skill in the art that various changes and modifications in form and details may be made without departing from the spirit and scope of the invention as set forth in the appended claims.

We claim:

1. Apparatus for generating and displaying user created animated objects having synchronized visual and audio characteristics, said apparatus comprising:

a program-controlled microprocessor;

first means coupled to said microprocessor and responsive to user input text for segmenting said user input text in accordance with predefined algorithms to generate a set of vector signals, each said vector signal associated with a sound segment of said user input text;

second means coupled to said microprocessor and to said first means and responsive to said user input text and said set of vector signals for generating a sequence of phonetic codes, each of said phonetic codes associated with a corresponding vector signal and its associated sound segment, each of said phonetic codes identifying a predefined visual image associated with said phonetic code;

display means coupled to said first and second means responsive to said set of vector signals for displaying a dendrogram defined by said set of vector signals and representative of an acoustical relationship among said sound segments of said user input text, each of said phonetic codes displayed on said dendrogram disposed in relative relationship with said associated sound segment; and controller means coupled to said first and second means, to said display means and to said microprocessor and having editing means for generating a set of instructions synchronizing said sequence of visual images with said associated sound segments corresponding to said user input text and for editing said set of instructions hereby defining an animated object having synchronized visual and audio characteristics.

2. Apparatus as in claim 1 further comprising audio means coupled to said microprocessor and to said controller means, said audio means responsive to said set of instructions for producing sounds associated with said phonetic codes, said display means responsive to said set of instructions for displaying said sequence of visual images of said animated object synchronized with said sound.

3. An apparatus for generating and displaying a user created animated object having synchronized visual and audio characteristics, the apparatus comprising:

a programmed computer including storage means for storing signals representing sound, a display device, an input means, a real-time random access speech synchronization animation means for controlling the animated object, editing means and speech segmentation generation means for displaying speech synchronization;

the input means for providing signals to the speech segmentation generation means, the signals representing text;

the speech segmentation generation means including first generation means, second generation means and third generation means;

the first generation means for generating acoustic information representing the text, the acoustic information having component parts;

the second generation means for generating visual information associated with the acoustic information, the visual information defining facial expressions associated with the acoustic information;

the third generation means for generating timing information, the timing information capable of being manipulated for synchronization between the visual information and the acoustic information; and the display device for providing an aligned display of the component parts of the acoustic information with the visual information and the timing information, the aligned display representative of a synchronization between the component parts and the visual and timing information associated therewith;

the editing means for editing the aligned display to adjust the timing values to alter the synchronization; and the programmed computer for synchronized integration of the acoustic, visual and timing information with the visual and audio characteristics to provide the animated object, the audio characteristics being retrieved from the storage means.

4. The apparatus of claim 3 wherein the acoustic information is a digital acoustic wave representation, the visual information is in a form of phonetic codes, and the timing information is timing values.

5. The apparatus of claim 4 wherein the aligned display illustrates a spacial relationship between the phonetic codes and the component parts of the digital acoustic wave representation.

6. The apparatus of claim 5 wherein the animation means uses the first generation means to automatically generate the acoustic wave representation for display.

7. The apparatus of claim 6 wherein the timing values are RECITE command timing values.

8. The apparatus of claim 7 wherein the RECITE command timing values and the phonetic codes are automatically computed and displayed with the animation means.

9. The apparatus of claim 3 wherein the animation means includes a real-time random access interface driver, scripting language, and animation and vivification engine language.

10. In a system having a programmed computer including a display device, an input device and a real-time random access speech synchronization animation means for controlling the animated object, a method for generating and displaying a user created animated object having synchronized visual and audio characteristics, the method comprising the steps of:

providing speech segmentation means for displaying speech synchronization;

providing signals representing text with the input device to the speech segmentation generation means;

generating acoustic information representing the text, the acoustic information having component parts;

generating visual information associated with the acoustic information, the visual information defining facial expressions associated with the acoustic information;

generating timing information capable of being manipulated for synchronization between the visual information and the acoustic information;

providing on the display device an aligned display of the component parts of the acoustic information with the visual information and the timing information, the aligned display representative of a synchronization between the component parts and the visual and timing information associated therewith;

editing the aligned display to adjust the timing values to manipulate the synchronization; and synchronized integration of the acoustic, visual and timing information with the visual and audio characteristics to provide the animated object.

11. The method of claim 10 wherein the acoustic information is a digital acoustic wave representation, the visual information is phenemes, and the timing information is timing values.

12. The method of claim 11 wherein the aligned display illustrates a spacial relationship between the phenemes and the component parts of the digital acoustic wave representation.

13. The method of claim 12 further comprising the step of automatically generating the digital acoustic wave representation for display on the display device with the animation means.

14. The method of claim 13 wherein the timing values are RECITE command timing values.

15. The method of claim 14 further comprising the steps of automatically computing and displaying the RECITE command timing values and the phenemes with the animation means.

16. The method of claim 10 wherein the animation means includes a real-time random access interface driver, scripting language, and animation and vivification engine language.

* * * * *